United States Patent
Ohtake

(10) Patent No.: US 7,920,332 B2
(45) Date of Patent: Apr. 5, 2011

(54) VARIABLE-FOCAL-LENGTH LENS SYSTEM AND IMAGING APPARATUS

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/654,934

(22) Filed: Jan. 8, 2010

(65) Prior Publication Data
US 2010/0220398 A1 Sep. 2, 2010

(30) Foreign Application Priority Data

Feb. 27, 2009 (JP) ................ P2009-046783

(51) Int. Cl.
*G02B 15/14* (2006.01)
(52) U.S. Cl. ...................................... 359/676
(58) Field of Classification Search .............. 359/676
See application file for complete search history.

(56) References Cited

U.S. PATENT DOCUMENTS
6,061,180 A * 5/2000 Hayakawa .................. 359/557

FOREIGN PATENT DOCUMENTS
| JP | 2007-108398 | 4/2007 |
| JP | 2007-264174 | 10/2007 |
| JP | 2007-264395 | 10/2007 |
| JP | 2008-146016 | 6/2008 |

* cited by examiner

Primary Examiner — William C Choi
(74) Attorney, Agent, or Firm — Rader, Fishman & Grauer PLLC

(57) ABSTRACT

A variable-focal-length lens system includes first to fifth lens groups having positive, negative, positive, negative, and positive refractive powers, respectively, from the object side. As the lens-position state changes from wide-angle to telephoto, the air space between the first and second lens groups increases, the air space between the second and third lens groups decreases, the air space between the third and fourth lens groups changes, the air space between the fourth and fifth lens groups increases, the first lens group moves monotonously toward the object, the second lens group is fixed in the optical-axis direction, and the third and fourth lens groups move toward the object. Conditions $0.2<D23w/ft<0.4$, $0.1<f2/f4<0.4$ are satisfied, $D23w$, $ft$, and $f2$ and $f4$ being the air space between the second and third lens groups at wide-angle, lens system's overall focal length at telephoto end, and focal lengths of the second and fourth lens groups, respectively.

10 Claims, 18 Drawing Sheets

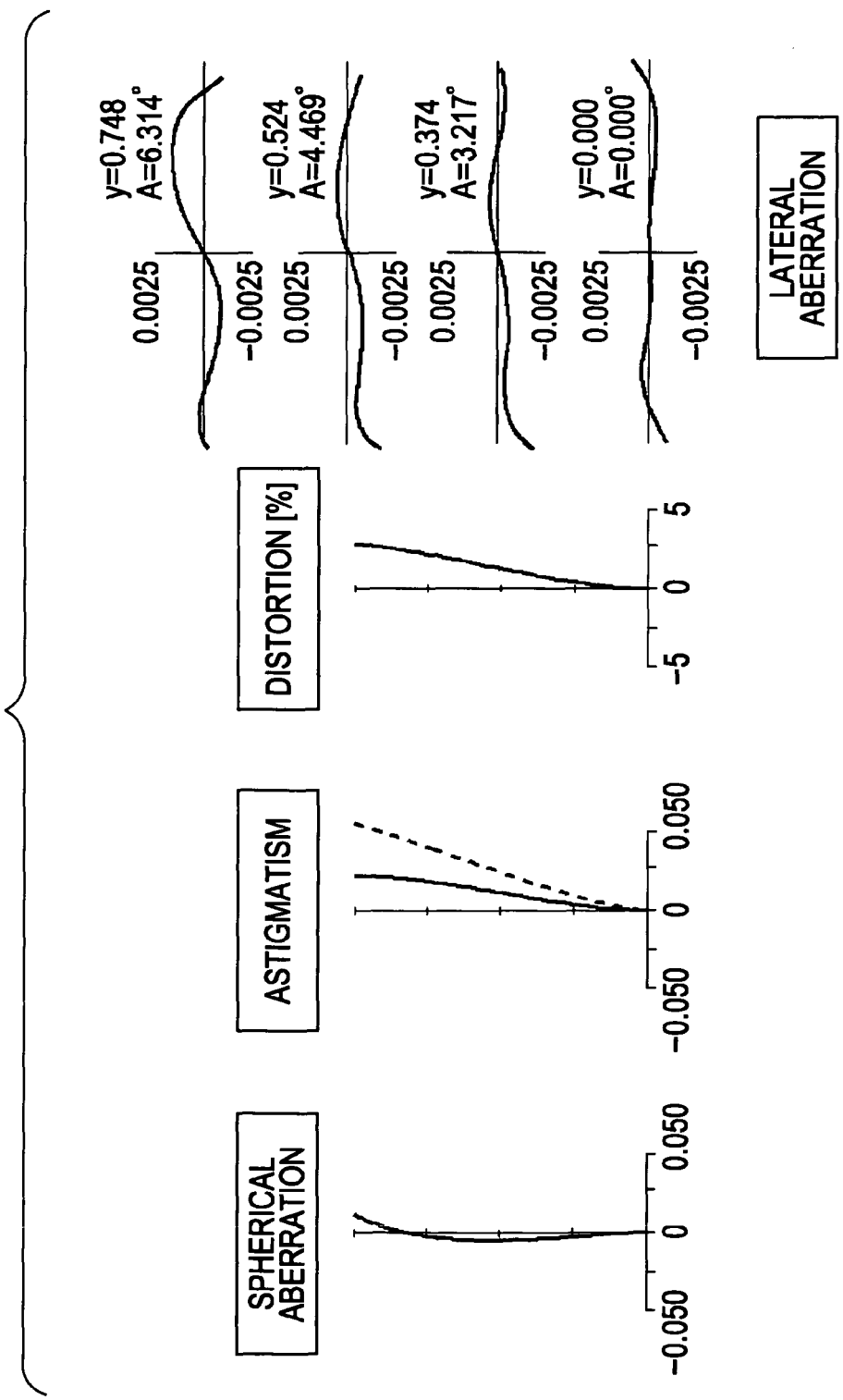

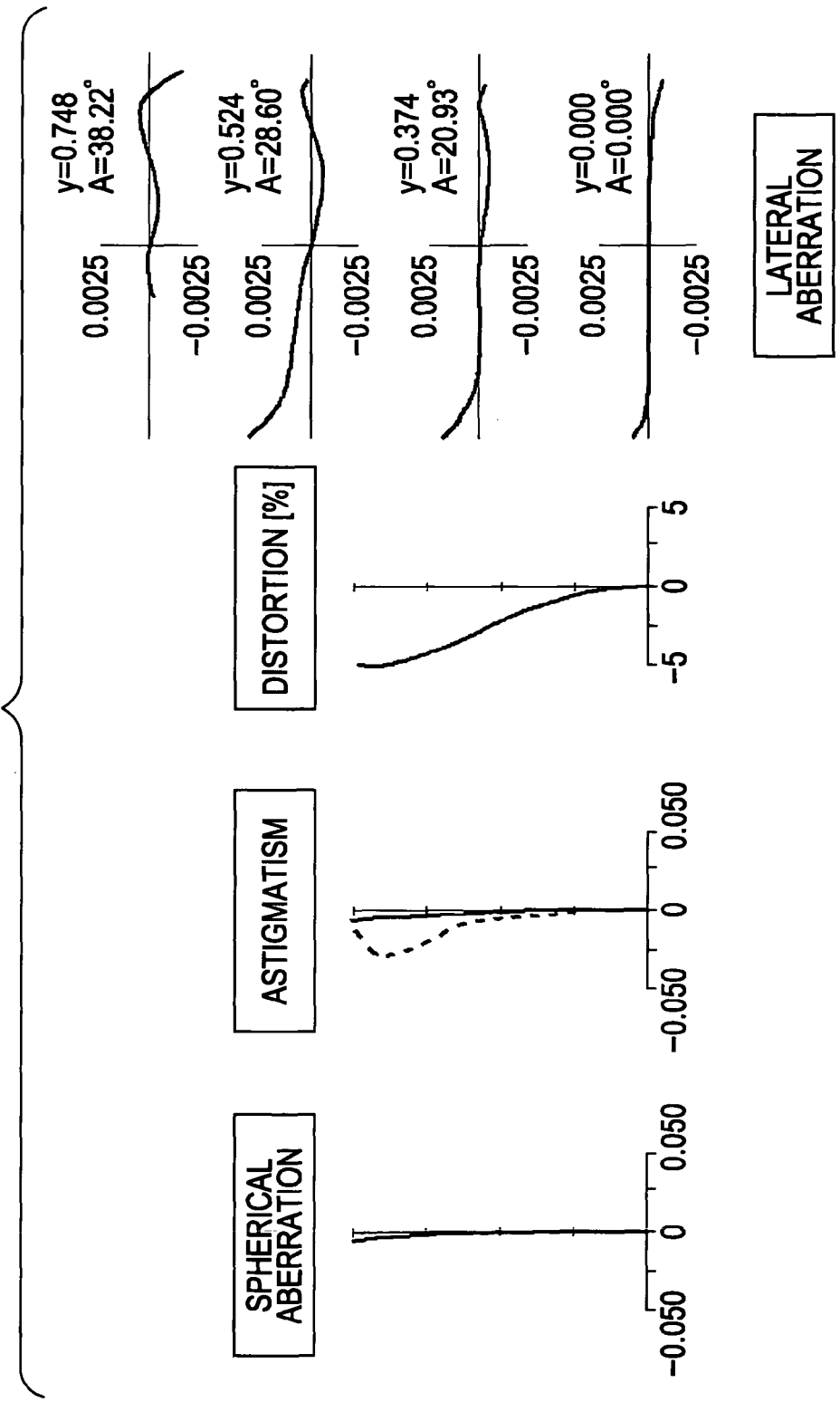

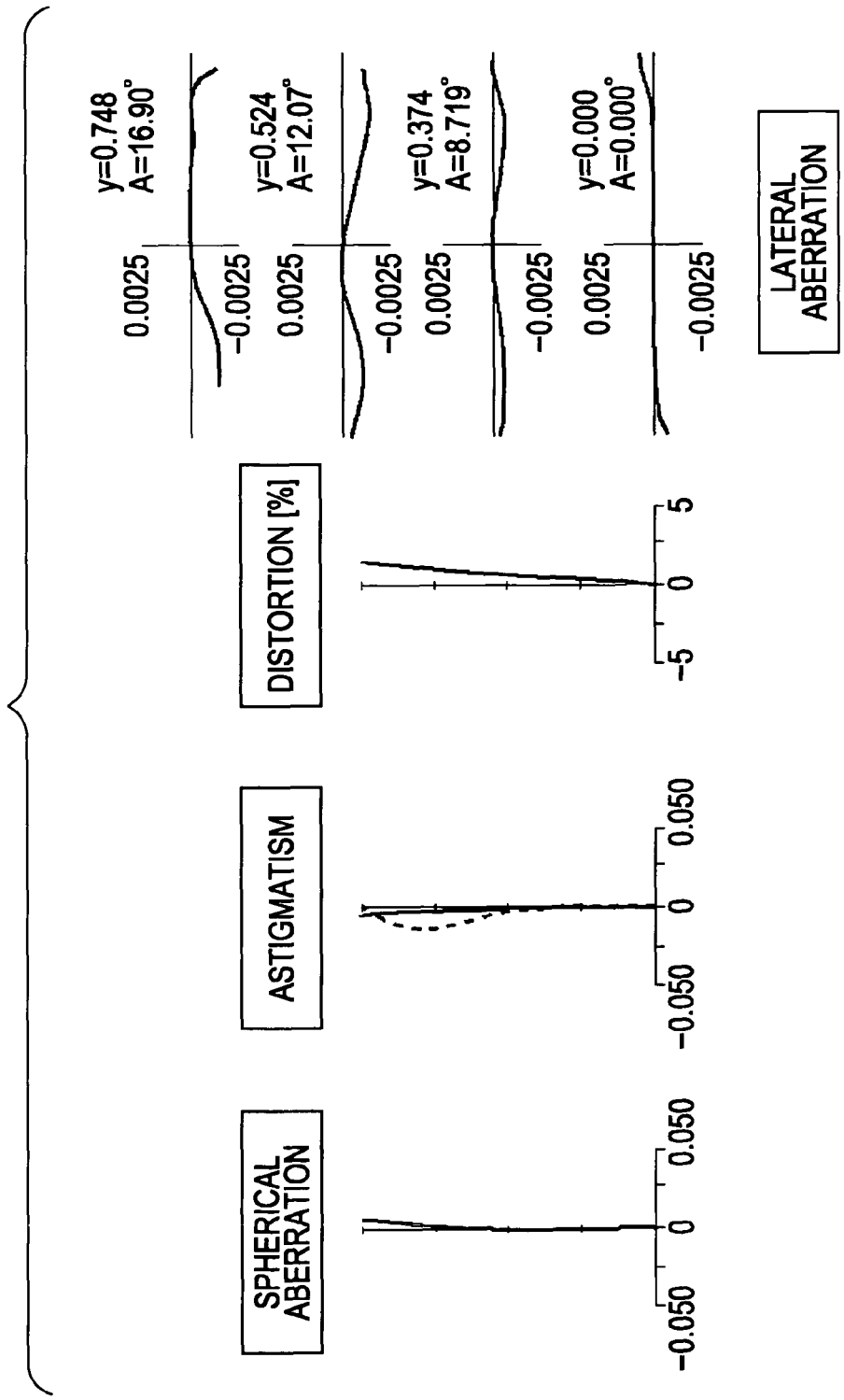

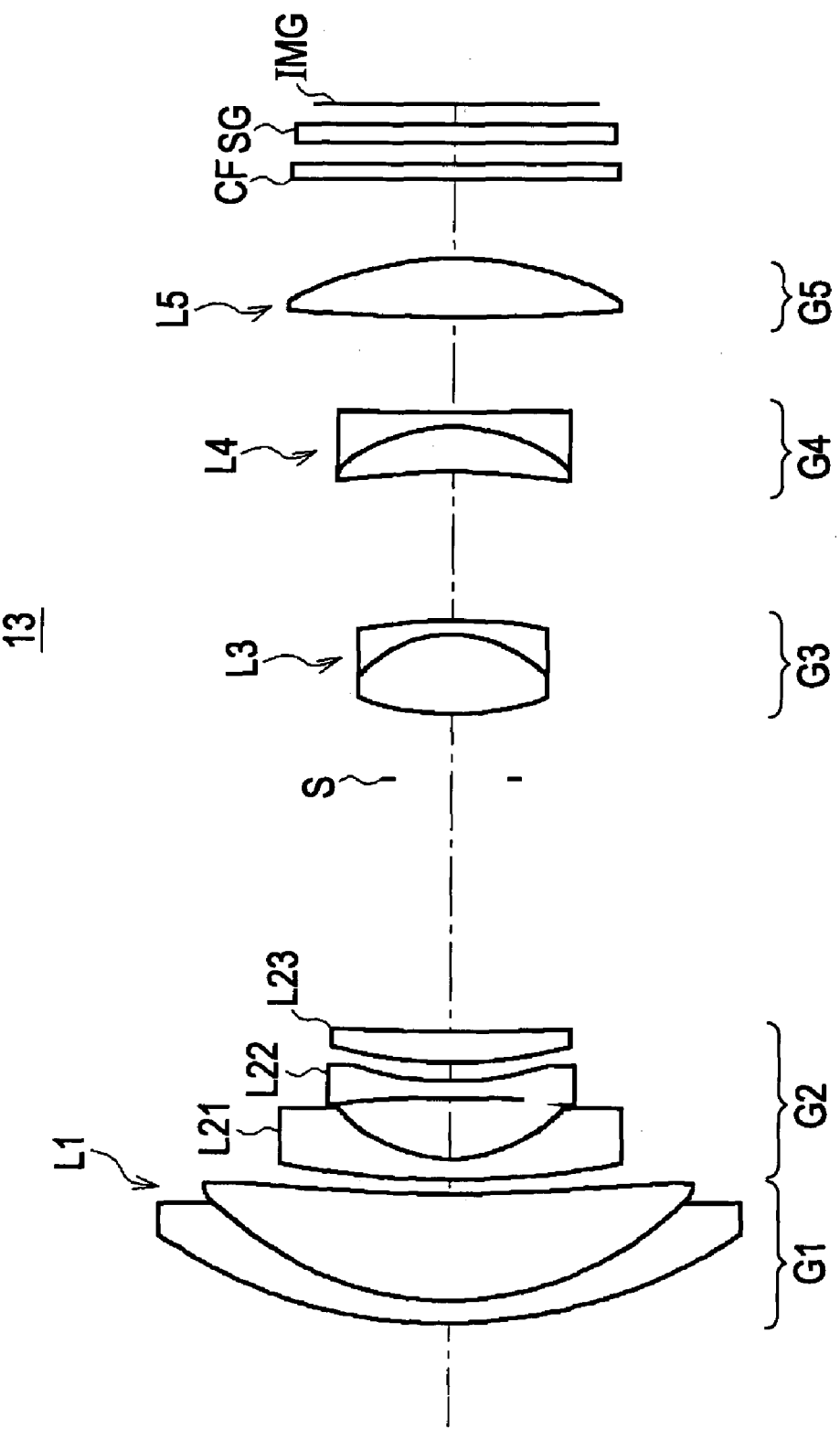

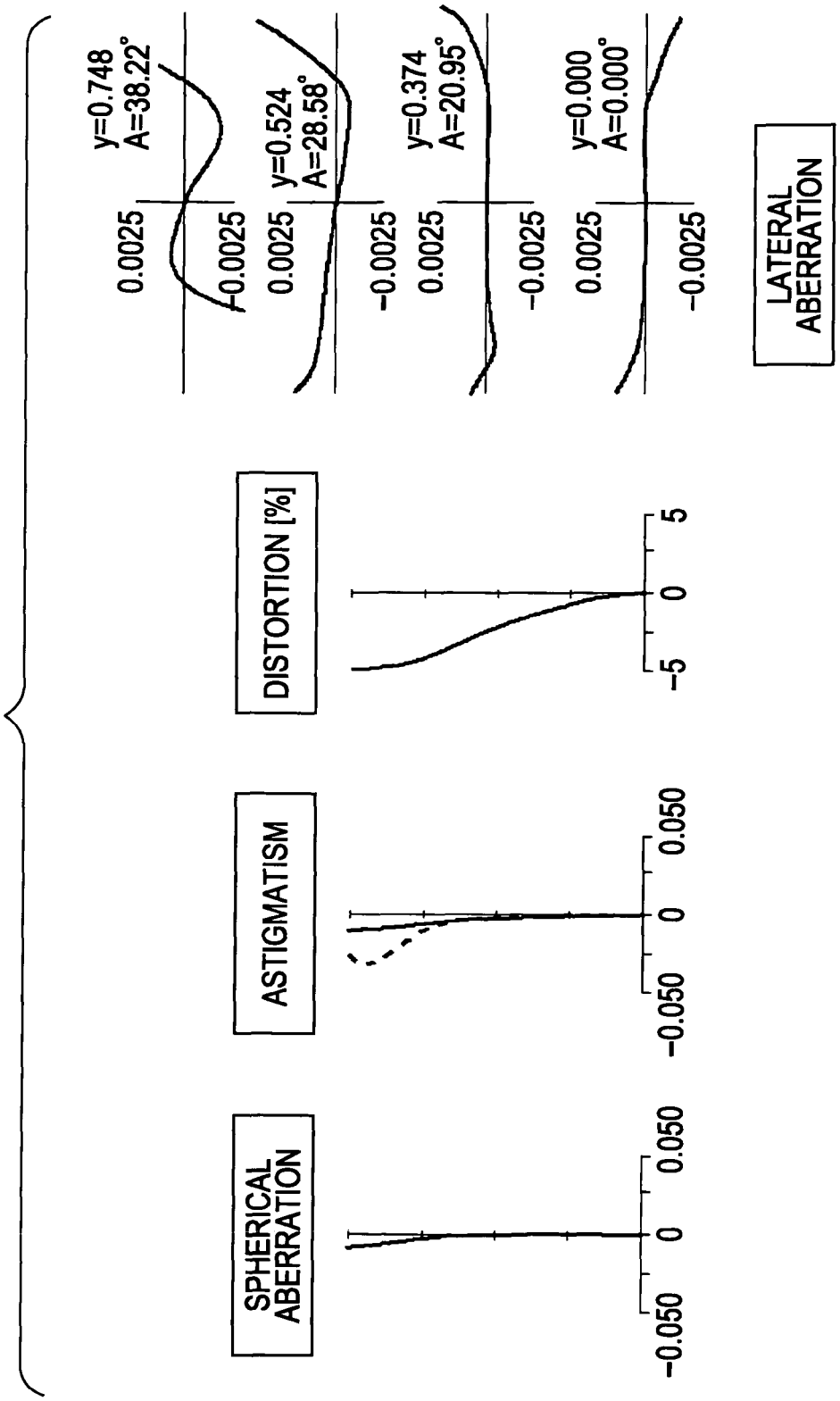

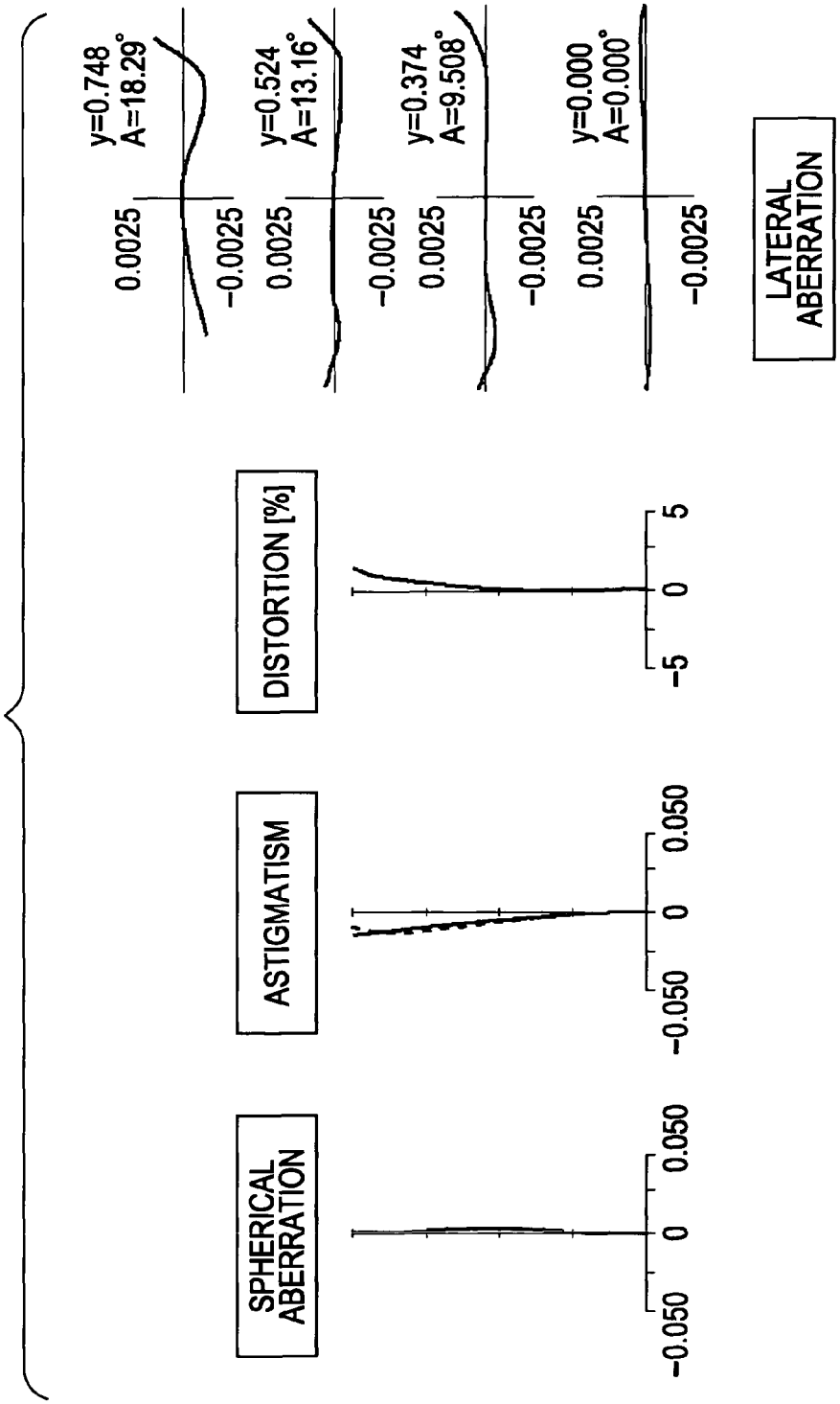

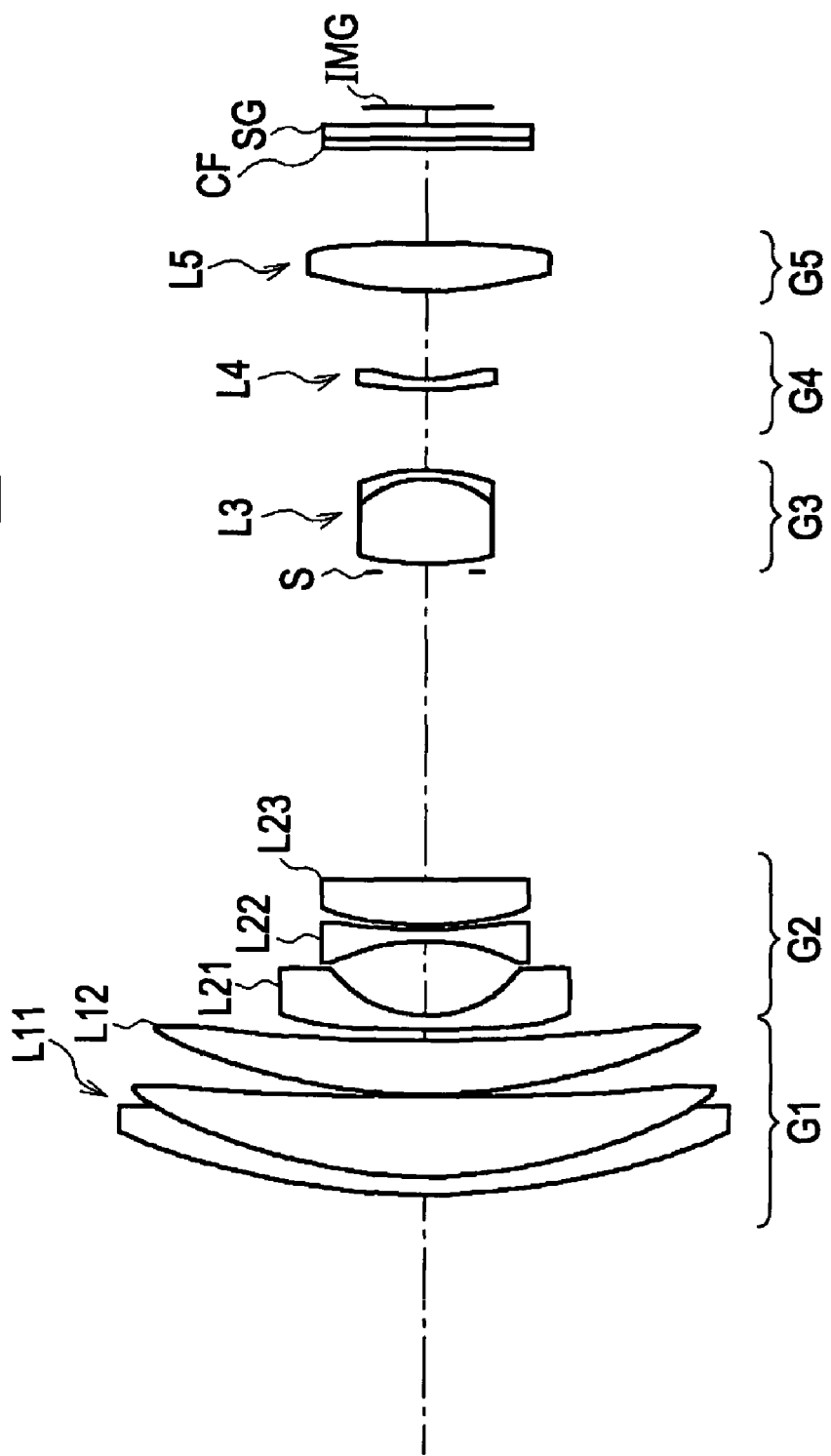

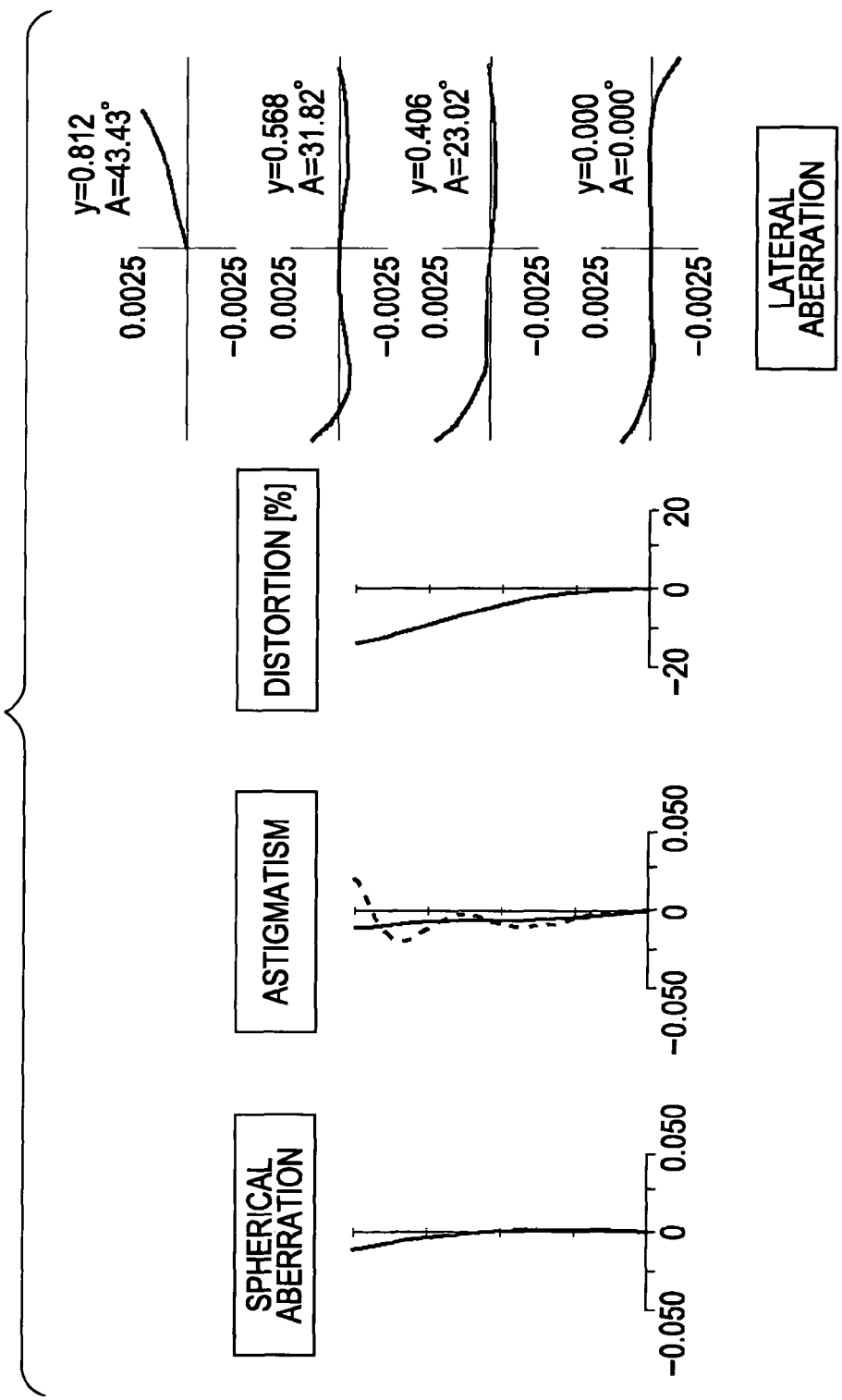

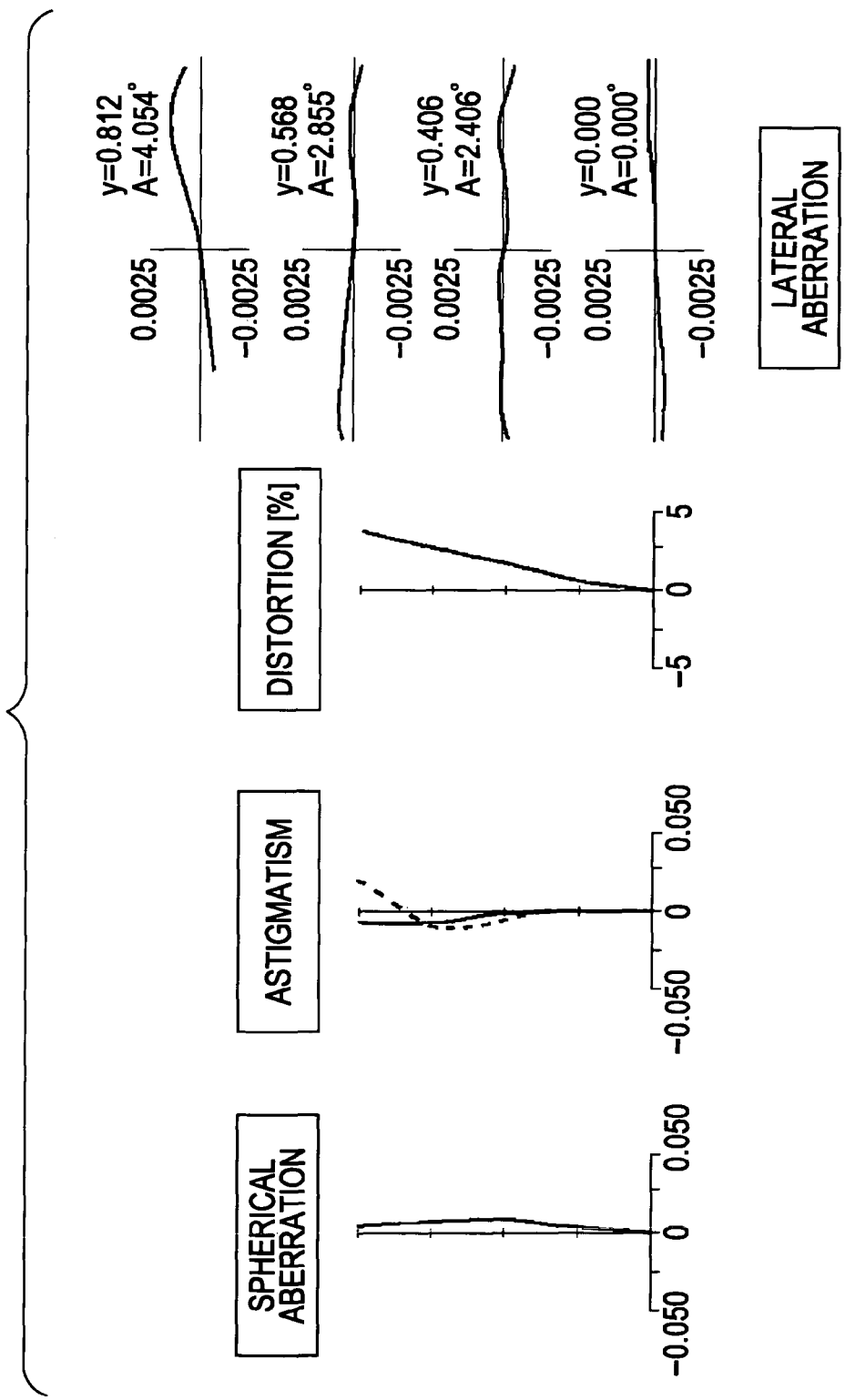

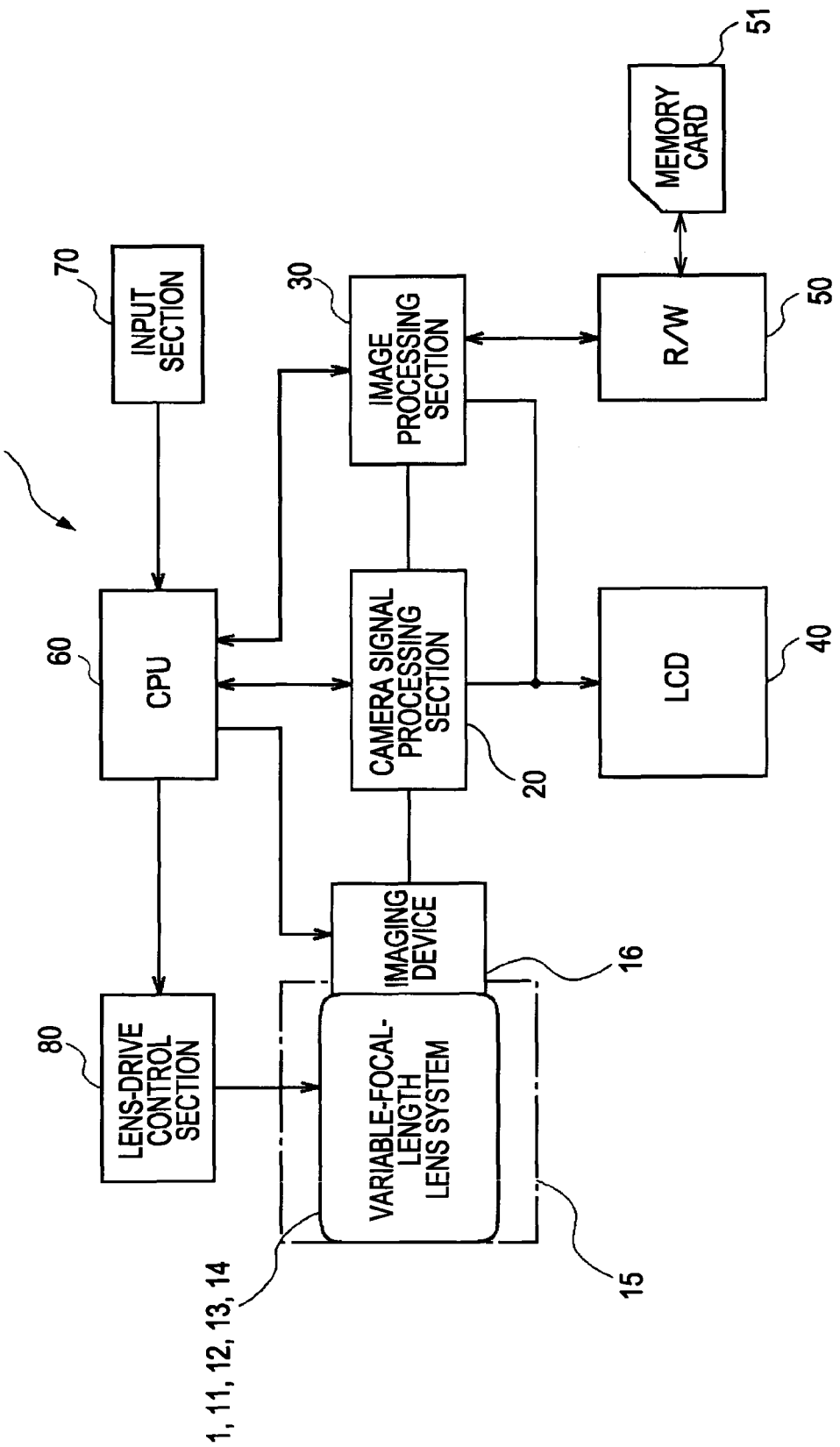

VARIABLE-FOCAL-LENGTH LENS SYSTEM AND IMAGING APPARATUS

BACKGROUND OF THE INVENTION

1. Field of the Invention

The present invention relates to a variable-focal-length lens system and an imaging apparatus. More specifically, the present invention relates to a variable-focal-length lens system used for a digital video camera, a digital still camera, or the like and having a zoom ratio of more than five times, and an imaging apparatus using the variable-focal-length lens system.

2. Description of the Related Art

In the related art, to perform recording in digital still cameras, a method exists in which the quantity of light of a subject's image formed on the surface of an imaging device using a photoelectric converter such as a CCD (Charge Coupled Device) sensor or a CMOS (Complementary Metal Oxide Semiconductor) sensor is converted into an electric output by the imaging device, thereby recording the subject's image.

Recent advances in microprocessing techniques have led to increases in the processing speed of central processing units (CPUs) and in the level of integration of recording media, making it increasingly possible to handle high-speed processing of large volumes of image data not possible in the past.

Higher levels of integration and miniaturization have been achieved for light-receiving devices as well. The higher levels of integration are making recording of higher spatial frequencies possible, and the miniaturization of light-receiving devices has led to the overall miniaturization of cameras.

However, the above-mentioned increases in the level of integration and miniaturization lead to narrower light-receiving areas of individual photoelectric converters, and the effect of noise becomes significant due to the resulting decrease in electric output. Attempts that have been made to prevent this problem include increasing the quantity of light reaching photoelectric converters by increasing the aperture ratio of the optical system, and placing minute lens elements (so-called microlens array) in front of individual photoelectric converters.

However, in exchange for guiding light beams falling in between adjacent photoelectric converters onto the photoelectric converters, this microlens array places constraints on the position of the exit pupil of the lens system (the distance from the image plane to the exit pupil).

This is because if the exit pupil position of a lens system becomes closer to the photoelectric converters, that is, if the angle formed between the principal ray reaching each photoelectric converter and the optical axis becomes larger, off-axis light beams going toward the periphery of the picture plane form large angles to the optical axis, and the off-axis light beams do not reach the photoelectric converters, resulting in insufficient light quantity.

As digital still cameras have become more and more common in recent years, users' needs are becoming increasingly diversified. In particular, there are a growing number of digital still cameras equipped with zoom lenses with high zoom ratios, and the number of zoom lenses with zoom ratios of more than five times is particularly increasing.

Generally speaking, these zoom lenses with high zoom ratios use a positive, negative, positive, positive four-group type as a zoom type representing the configuration of the zoom lenses. This positive, negative, positive, positive four-group type zoom lens includes a first lens group having positive refractive power, a second lens group having negative refractive power, a third lens group having positive refractive power, and a fourth lens group having positive refractive power, which are arranged in this order from the object side.

In the case of this positive, negative, positive, positive four-group type zoom lens, as the lens position state changes from the wide-angle end state with the shortest focal length to the telephoto end state with the longest focal length, the individual lens groups from the first to third lens groups move in such a way that the space between the first lens group and the second lens groups increases and the space between the second lens group and the third lens group decreases, and variations in the image plane position (focus position) of the imaging device are compensated for by the movement of the four lens group that is driven separately (for example, Japanese Unexamined Patent Application Publication No. 2008-146016).

As a zoom lens used as an interchangeable lens or the like, a positive, negative, positive, negative, positive five-group type exists as a zoom type that realizes high zoom ratio or high optical performance by increasing the number of movable lens groups.

This five-group type zoom lens includes a first lens group having positive refractive power, a second lens group having negative refractive power, a third lens group having positive refractive power, a fourth lens group having negative refractive power, and a fifth lens group having positive refractive power, which are arranged in order from the object side.

In the case of such a five-group type zoom lens, as the lens position state changes from the wide-angle end state to the telephoto end state, the individual lens groups move in such a way that the space between the first lens group and the second lens groups increases, the space between the second lens group and the third lens group decreases, the space between the third lens group and the fourth lens groups increases, and the space between the fourth lens group and the fifth lens group decreases (for example, Japanese Unexamined Patent Application Publication No. 2007-108398).

There are also five-group type zoom lenses applied to non-interchangeable type cameras with no limitations on back focus (for example, Japanese Unexamined Patent Application Publication No. 2007-264174 and Japanese Unexamined Patent Application Publication No. 2067-264395).

SUMMARY OF THE INVENTION

There are limits to miniaturization in the case of the positive, negative, positive, positive four-group type zoom lens according to the related art described in Japanese Unexamined Patent Application Publication No. 2008-146016 above. In practice, the zoom lens can be miniaturized in the optical axis direction by increasing the refractive power of the second lens group to attain high zoom ratio, and reducing the amount of change in the space between the first lens group and the second lens group or the amount of change in the space between the second lens group and the third lens group.

Although such a miniaturization technique is simple, in the case of a zoom lens in which only the refractive power of the second lens is increased, it is not possible to correct negative distortion and magnification chromatic aberration occurring in the wide-angle end state in a satisfactory manner, making it difficult to attain sufficient optical performance. This is because the overall refractive power arrangement of the lens system becomes asymmetrical due to the presence of only one negative lens group arranged within the zoom lens.

In contrast, in the case of a positive, negative, positive, negative, positive five-group type zoom lens, since two negative lens groups are present, the overall refractive power arrangement of the lens system becomes symmetrical, which makes it possible to overcome the above-described problem associated with a positive, negative, positive, positive four-group type zoom lens.

However, in the case of the positive, negative, positive, negative, positive five-group type zoom lens described in Japanese Unexamined Patent Application Publication No. 2007-264174 above, the increase in the number of movable lens groups adds complexity to the lens-barrel structure.

In the case of the positive, negative, positive, negative, positive five-group type zoom lens described in Japanese Unexamined Patent Application Publication No. 2007-264395 above, since the first lens group and the fourth lens group are fixed in the optical axis direction, the lens-barrel structure does not become complex. However, since the total length in the wide-angle end state becomes longer, the zoom lens is not suitable for achieving reduction of the lens diameter and, at the same time, it is difficult to reduce the total length of the lens.

It is desirable to provide a variable-focal-length lens system that is suitable for realizing both miniaturization and higher zoom ratio at the same time.

According to an embodiment of the present invention, there is provided a variable-focal-length lens system according to an embodiment of the present invention including, in order from an object side, a first lens group having positive refractive power, a second lens group having negative refractive power, a third lens group having positive refractive power, a fourth lens group having negative refractive power, and a fifth lens group having positive refractive power, in which: as a lens position state changes from a wide-angle end state to a telephoto end state, an air space between the first lens group and the second lens group increases, an air space between the second lens group and the third lens group decreases, an air space between the third lens group and the fourth lens group changes, an air space between the fourth lens group and the fifth lens group increases, the first lens group moves monotonously to the object side, the second lens group is fixed in an optical axis direction, and the third lens group and the fourth lens group move to the object side; and the following conditional expressions (1) and (2) are satisfied $$0.2<D23w/ft<0.4 \quad (1)$$

$$0.1<f2/f4<0.4 \quad (2)$$

where D23w is an air space between the second lens group and the third lens group in the wide-angle end state, ft is a focal length of the variable-focal-length lens system as a whole in the telephoto end state, f2 is a focal length of the second lens group, and f4 is a focal length of the fourth lens group.

The conditional expression (1) defines the air space between the second lens group and the third lens group in the wide-angle end state, and expresses a first feature described later as a numerical limitation.

That is, in the telephoto end state, the second lens group and the third lens group are located adjacent to each other, and the second lens group is fixed in the optical axis direction when the lens position state changes. Consequently, the air space between the second lens group and the third lens group in the wide-angle end state becomes substantially equal to the amount of movement of the third lens group accompanying a change in lens position state.

In the variable-focal-length lens system according to an embodiment of the present invention, a value above the upper limit of the conditional expression (1) causes off-axis light beams passing through the first lens group and the second lens group to move away from the optical axis. In particular, comatic aberration occurs rapidly around the edges of the picture plane in the wide-angle end state, making it difficult to attain a predetermined optical performance.

A value below the lower limit of the conditional expression (1) causes off-axis light beams passing through the second lens group to move closer to the optical axis, making it difficult to correct on-axis aberration and off-axis aberration at the same time. As a result, it is not possible to correct for variations in off-axis aberration accompanying changes in angle of view in a satisfactory manner.

The conditional expression (2) is for setting the focal length of the second lens group and the focal length of the fourth lens group appropriately, and expresses a second feature described later as a numerical limitation.

In the variable-focal-length lens system according to an embodiment of the present invention, a value below the lower limit of the conditional expression (2) either causes the refractive power of the second lens group to intensify or causes the refractive power of the fourth lens group to weaken. In the former case, in the variable-focal-length lens system according to an embodiment of the present invention, as described above, the total length of the lens system becomes long and, as a result, it is not possible to achieve sufficient miniaturization.

On the other hand, in the latter case, in the variable-focal-length lens system according to an embodiment of the present invention, it is not possible to correct negative distortion occurring in the wide-angle end state in a satisfactory manner, making it difficult to attain satisfactory image-formation performance.

A value above the upper limit of the conditional expression (2) either causes the refractive power of the second lens group to weaken or causes the refractive power of the fourth lens group to intensify. In the former case, in the variable-focal-length lens system according to an embodiment of the present invention, the refractive power of the second lens group weakens, resulting in an increase in the amount of movement of the first lens group and the third lens group necessary for attaining a predetermined zoom ratio.

As a result, in the wide-angle end state, the first lens group whose amount of movement has increased, and the second lens group that is fixed in the optical axis direction come into interference with each other, or, in the telephoto end state, the second lens group that is fixed in the optical axis direction and the third lens group whose amount of movement has increased come into interference with each other. If this happens, it is no longer possible to keep the second lens group fixed in the optical axis direction, which detracts from the scope of the present invention.

On the other hand, in the latter case, in the variable-focal-length lens system according to an embodiment of the present invention, it is not possible to shorten the total length of the lens system in the telephoto end state, making it difficult to achieve sufficient miniaturization.

According to an embodiment of the present invention, there is provided an imaging apparatus including a variable-focal-length lens system, and an imaging device that converts an optical image formed by the variable-focal-length lens system into an electrical signal, in which: the variable-focal-length lens system includes, in order from an object side, a first lens group having positive refractive power, a second lens group having negative refractive power, a third lens group having positive refractive power, a fourth lens group having negative refractive power, and a fifth lens group having positive refractive power; as a lens position state changes from a wide-angle end state to a telephoto end state, an air space between the first lens group and the second lens group increases, an air space between the second lens group and the third lens group decreases, an air space between the third lens group and the fourth lens group changes, an air space between the fourth lens group and the fifth lens group increases, the first lens group moves monotonously to the object side, the second lens group is fixed in an optical axis direction, and the third lens group and the fourth lens group move to the object side; and the following conditional expressions (1) and (2) are satisfied $$0.2 < D23w/ft < 0.4 \quad (1)$$

$$0.1 < f2/f4 < 0.4 \quad (2)$$

where D23$w$ is an air space between the second lens group and the third lens group in the wide-angle end state, ft is a focal length of the variable-focal-length lens system as a whole in the telephoto end state, f2 is a focal length of the second lens group, and f4 is a focal length of the fourth lens group.

In the variable-focal-length lens system in the imaging apparatus, the conditional expression (1) defines the air space between the second lens group and the third lens group in the wide-angle end state, and expresses a first feature described later as a numerical limitation.

That is, in the telephoto end state, the second lens group and the third lens group are located adjacent to each other, and the second lens group is fixed in the optical axis direction when the lens position state changes. Consequently, the air space between the second lens group and the third lens group in the wide-angle end state becomes substantially equal to the amount of movement of the third lens group accompanying a change in lens position state.

In the variable-focal-length lens system according to an embodiment of the present invention, a value above the upper limit of the conditional expression (1) causes off-axis light beams passing through the first lens group and the second lens group to move away from the optical axis. In particular, comatic aberration occurs rapidly around the edges of the picture plane in the wide-angle end state, making it difficult to attain a predetermined optical performance.

A value below the lower limit of the conditional expression (1) causes off-axis light beams passing through the second lens group to move closer to the optical axis, making it difficult to correct on-axis aberration and off-axis aberration at the same time. As a result, it is not possible to correct for variations in off-axis aberration accompanying changes in angle of view in a satisfactory manner.

The conditional expression (2) is for setting the focal length of the second lens group and the focal length of the fourth lens group appropriately, and expresses a second feature described later as a numerical limitation.

In the variable-focal-length lens system according to an embodiment of the present invention, a value below the lower limit of the conditional expression (2) either causes the refractive power of the second lens group to intensify or causes the refractive power of the fourth lens group to weaken. In the former case, in the variable-focal-length lens system according to an embodiment of the present invention, as described above, the total length of the lens system becomes long and, as a result, it is not possible to achieve sufficient miniaturization.

On the other hand, in the latter case, in the variable-focal-length lens system according to an embodiment of the present invention, it is not possible to correct negative distortion occurring in the wide-angle end state in a satisfactory manner, making it difficult to attain satisfactory image-formation performance.

A value above the upper limit of the conditional expression (2) either causes the refractive power of the second lens group to weaken or causes the refractive power of the fourth lens group to intensify. In the former case, in the variable-focal-length lens system according to an embodiment of the present invention, the refractive power of the second lens group weakens, resulting in an increase in the amount of movement of the first lens group and the third lens group necessary for attaining a predetermined zoom ratio.

As a result, in the wide-angle end state, the first lens group whose amount of movement has increased, and the second lens group that is fixed in the optical axis direction come into interference with each other, or, in the telephoto end state, the second lens group that is fixed in the optical axis' direction and the third lens group whose amount of movement has increased come into interference with each other. If this happens, it is no longer possible to keep the second lens group fixed in the optical axis direction, which detracts from the scope of the present invention.

On the other hand, in the latter case, in the variable-focal-length lens system according to an embodiment of the present invention, it is not possible to shorten the total length of the lens system in the telephoto end state, making it difficult to achieve sufficient miniaturization.

According to an embodiment of the present invention, a first lens group having positive refractive power, a second lens group having negative refractive power, a third lens group having positive refractive power, a fourth lens group having negative refractive power, and a fifth lens group having positive refractive power are provided in order from an object side. As a lens position state changes from a wide-angle end state to a telephoto end state, an air space between the first lens group and the second lens group increases, an air space between the second lens group and the third lens group decreases, an air space between the third lens group and the fourth lens group changes, an air space between the fourth lens group and the fifth lens group increases, the first lens group moves monotonously to the object side, the second lens group is fixed in an optical axis direction, and the third lens group and the fourth lens group move to the object side. In addition, the following conditional expressions (1) and (2) are satisfied:

$$0.2 < D23w/ft < 0.4 \quad (1)$$

$$0.1 < f2/f4 < 0.4 \quad (2)$$

where D23$w$ is an air space between the second lens group and the third lens group in the wide-angle end state, ft is a focal length of the variable-focal-length lens system as a whole in the telephoto end state, f2 is a focal length of the second lens group, and f4 is a focal length of the fourth lens group.

Thus, the variable-focal-length lens system according to an embodiment of the present invention makes it possible to realize both further miniaturization and further higher zoom ratio at the same time than in the related art.

Moreover, the imaging apparatus according to an embodiment of the present invention makes it possible to achieve further higher zoom ratio and further higher performance by use of the variable-focal-length lens system that realizes both further miniaturization and further higher zoom ratio at the same time than in the related art.

BRIEF DESCRIPTION OF THE DRAWINGS

FIGS. 3A to 3C are characteristic curve diagrams showing various aberrations according to the first numerical example;

FIGS. 5A to 5C are characteristic curve diagrams showing various aberrations according to the second numerical example;

FIG. 6 is a schematic cross sectional view showing the configuration of a variable-focal-length lens system according to a third numerical example;

FIGS. 7A to 7C are characteristic curve diagrams showing various aberrations according to the third numerical example;

FIG. 8 is a schematic cross sectional view showing the configuration of a variable-focal-length lens system according to a fourth numerical example;

FIGS. 9A to 9C are characteristic curve diagrams showing various aberrations according to the fourth numerical example; and FIG. 10 is a schematic block diagram showing the circuit configuration of a digital still camera equipped with an imaging apparatus according to an embodiment of the present invention.

DESCRIPTION OF THE PREFERRED EMBODIMENTS

Figure 1:
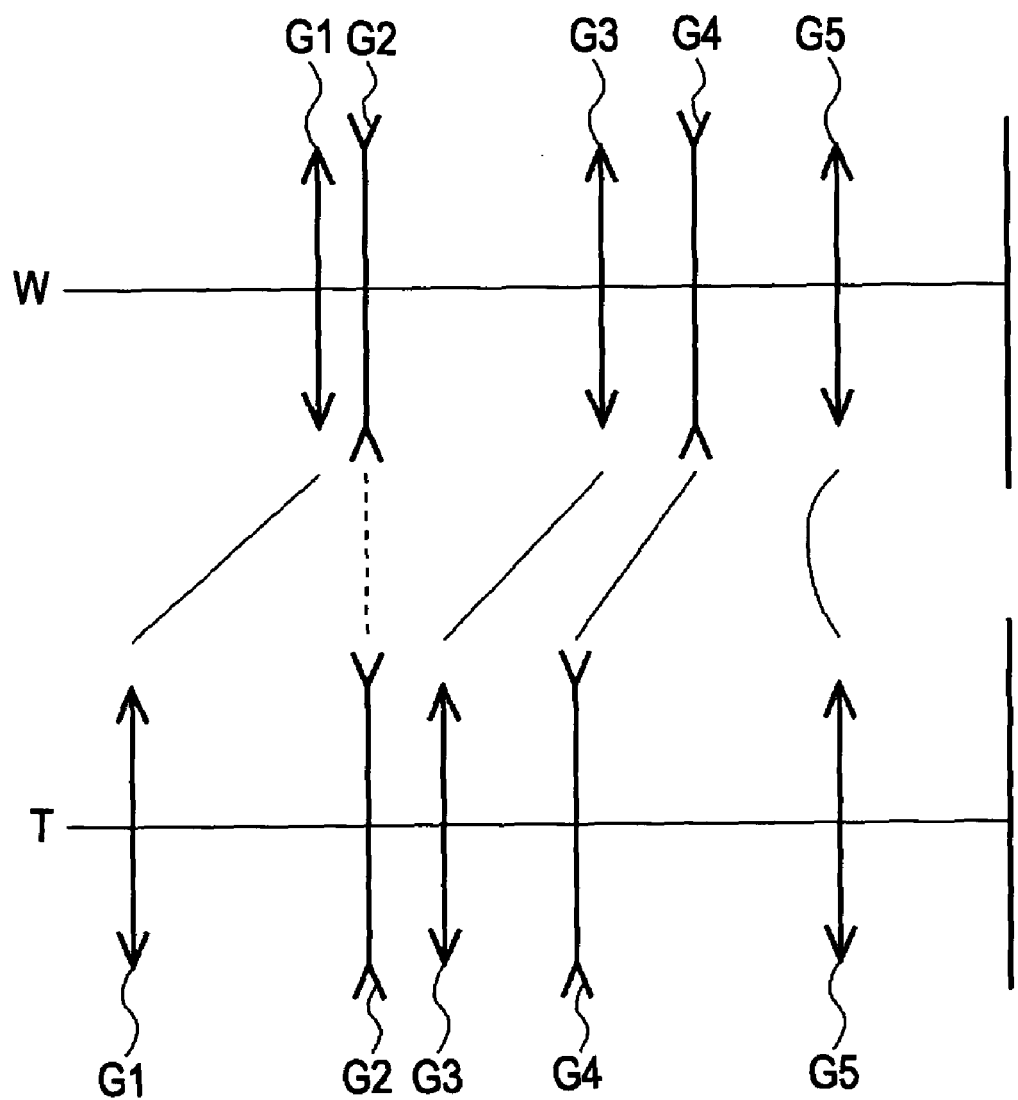
FIG. 1 is a schematic diagram showing refractive power distribution of a variable-focal-length lens system according to each of numerical examples.

Hereinbelow, the best modes for carrying out the present invention (hereinafter, referred to as embodiments) will be described. The description will be made in the following order of topics.
1. Embodiment (variable-focal-length lens system)
2. Numerical Examples (first to fourth numerical examples).
3. Imaging Apparatus and Digital Still Camera
4. Other Embodiments

1. Embodiment

1-1. Configuration of Variable-focal-length Lens System

In an embodiment of the present invention, a lens system in which the focus point changes as the focal distance changes is referred to as variable-focal-length lens system. In contrast, since a zoom lens is a lens system configured so that the focus point does not change even when the focal length changes, a zoom lens is to be regarded as one type of variable-focal-length lens system.

The variable-focal-length lens system according to an embodiment of the present invention has, in order from the object side, a first lens group having positive refractive power, a second lens group having negative refractive power, a third lens group having positive refractive power, a fourth lens group having negative refractive power, and a fifth lens group having positive refractive power.

Specifically, the variable-focal-length lens system is configured in such a way that when the lens position state changes from the wide-angle end state to the telephone end state, the air space between the first lens group and the second lens group increases, the air space between the second lens group and the third lens group decreases, the air space between the third lens group and the fourth lens group changes, the air space between the fourth lens group and the fifth lens group increases, the first lens group moves monotonously to the object side, the second lens group is fixed in the optical axis direction, and the third lens group and the fourth lens group move to the object side.

Further, this variable-focal-length lens system is configured in such a way that the fifth lens is separately driven to move so as to compensate for variations in image plane position caused by movement of the first lens group, the third lens group, and the fourth lens group.

Generally speaking, if the number of lenses forming a zoom lens is increased, the degree of freedom in aberration correction increases, so it is possible to achieve sufficiently high optical performance even when the zoom ratio is increased. However, if the number of lenses is simply increased, the lens drive mechanism becomes complex. A common way to overcome this problem is to add a lens group that is fixed in the optical axis direction.

For example, in the case of interchangeable lenses, as a positive, negative, positive, negative, positive five-group configuration, a zoom type exists in which the fourth lens group is fixed in the optical axis direction. Specifically, such a lens is disclosed in Japanese Unexamined Patent Application No. 2003-241093. In this type of interchangeable lens, the fourth lens group is fixed in the optical axis direction for the purpose of reducing the amount of movement of the first lens group.

In contrast, in the case of lenses integrated with cameras, if the total lens length in the wide-angle end state is made shorter, off-axis light beams passing through the first lens group in the wide-angle end state are brought closer to the optical axis, which is advantageous in facilitating a reduction in lens diameter.

Accordingly, in the case of the variable-focal-length lens system according to an embodiment of the present invention, in order to make the total lens length in the wide-angle end state shorter, the second lens group is fixed in the optical axis direction in the wide-angle end state and the telephoto end state to thereby reduce the number of movable lens groups and simplify the configuration of the lens system.

Consequently, in the variable-focal-length lens system according to an embodiment of the present invention, the variable spaces between individual lens groups can be increased while reducing the number of variable lens groups from five to four, thereby making it possible to achieve miniaturization by simplifying the overall configuration of the lens system and also achieve higher zoom ratio.

First, a description will be given of the functions of individual lens groups constituting the variable-focal-length lens system according to an embodiment of the present invention. In the variable-focal-length lens system according to an embodiment of the present invention, in the wide angle end state, the first lens group and the second lens group are arranged in close proximity to each other to thereby achieve a reduction in lens diameter.

This is because since the first lens group has positive refractive power, the first lens group bends light strongly, resulting in an increase in the angle formed. Consequently, as the distance between the first lens group and the second lens group becomes greater, the off-axis light beams having passed through the first lens group spread out more.

At this time, in the variable-focal-length lens system according to an embodiment of the present invention, in the wide-angle end state, the first lens group and the second lens group are arranged in close proximity to each other. As a result, it is possible to keep off-axis light beams incident on the first lens group from moving away the optical axis, thereby making it possible to suppress off-axis aberration that occurs at the periphery of the picture plane.

At the same time, in the variable-focal-length lens system according to an embodiment of the present invention, as the lens position state changes toward the telephoto end state, the air space between the first lens group and the second lens group is widened. Consequently, off-axis light beams passing through the first lens group move away from the optical axis, and by exploiting the resulting change in height, variations in off-axis aberration accompanying changes in lens position state are corrected for in a satisfactory manner.

In particular, in the variable-focal-length lens system according to an embodiment of the present invention, the total lens length is varied to be shorter in the wide-angle end state and longer in the telephoto end state, thereby keeping off-axis light beams incident on the first lens group in the wide-angle end state with a wide angle of view from moving too far away from the optical axis.

Further, in the variable-focal-length lens system according to an embodiment of the present invention, by widening the air space between the second lens group and the third lens group in the wide-angle end state, off-axis light beams passing through the second lens group can be moved farther away from the optical axis, thereby making it possible to correct on-axis aberration and off-axis aberration independently.

Further, in the variable-focal-length lens system according to an embodiment of the present invention, as the lens position state changes toward the telephoto end state, the air space between the second lens group and the third lens group is narrowed, thereby bringing off-axis light beams passing through the second lens group closer to the optical axis. Consequently, variations in off-axis aberration accompanying changes in lens position state can be corrected for in a satisfactory manner for enhanced performance.

At this time, in the variable-focal-length lens system according to an embodiment of the present invention, the second lens group is fixed in the optical axis direction and, at the same time, in order to correct for variations in off-axis aberration accompanying changes in lens position state in a satisfactory manner, the air space between the third lens group and the fourth lens group is changed.

Further, in the variable-focal-length lens system according to an embodiment of the present invention, the fifth lens group is moved in accordance with changes in lens position state so as to compensate for variations in image plane position, thereby correcting for variations in off-axis aberration accompanying changes in lens position state in a more satisfactory manner.

It should be noted that in the variable-focal-length lens system according to an embodiment of the present invention, the fourth lens group having negative refractive power and the fifth lens group having positive refractive power are arranged on the image side of the third lens group. By arranging two negative lens groups, the second lens group and the fourth lens group, the overall refractive power arrangement of the lens system is made closer to symmetrical, thereby correcting negative distortion and magnification chromatic aberration, which are particularly liable to occur in the wide-angle end state, in a satisfactory manner.

However, in the variable-focal-length lens system according to an embodiment of the present invention, since the second lens group is fixed in the optical axis direction, the degree of freedom in the selection of a zoom track decreases, which gives rise to two problems.

The first problem is that it is not possible to correct for variations in various aberrations that occur as the lens position state changes, and the second problem is that it is not possible to achieve sufficient miniaturization. Generally speaking, miniaturization is classified into reduction of the lens diameter and shortening of the total lens length, of which the shortening of the total lens length becomes a problem in the present invention.

With respect to the first problem, in the variable-focal-length lens system according to an embodiment of the present invention, the zooming action of the second lens group is weakened to thereby correct for variations in various aberrations in a satisfactory manner. However, since simply weakening the zooming action of the second lens group results in a decrease in the overall zoom ratio of the lens system, in the variable-focal-length lens system according to an embodiment of the present invention, the zooming action of the third lens group is enhanced to thereby attain a predetermined zoom ratio.

More specifically, a predetermined zoom ratio can be attained by either increasing the amount of movement of the third lens group or intensifying the refractive power of the third lens group. However, if the refractive power is intensified, it is not possible to correct negative spherical aberration occurring in the third lens group in a satisfactory manner.

Accordingly, in the variable-focal-length lens system according to an embodiment of the present invention, the amount of movement of the third lens group is increased for enhanced zooming action, thereby achieving high optical performance while attaining a predetermined zoom ratio. It should be noted that enhancing the zooming action means increasing the amount of change in lateral magnification between the wide-angle end state and the telephoto end state.

On the other hand, with respect to the second problem, in the variable-focal-length lens system according to an embodiment of the present invention, the refractive power of the second lens group having negative refractive power is weakened for weaker diverging action. As a result, the overall length of the lens system can be shortened.

It should be noted that in the variable-focal-length lens system according to an embodiment of the present invention, to achieve miniaturization in a more effective way, the refractive power of the second lens group having negative refractive power is weakened, and the refractive power of the fourth lens group having negative refractive power is intensified, thereby making it possible to achieve further shortening of focal length in the first to third lens groups.

However, the variable-focal-length lens system according to an embodiment of the present invention has a problem in that, if the refractive power of the fourth lens group is intensified excessively, it is not possible to set the exit pupil position to an appropriate position, or if the refractive power of the second lens group is weakened excessively, off-axis light beams incident on the first lens group in the wide-angle end state move away from the optical axis, which detracts from reduction of the lens diameter.

For the above reasons, as a first feature of the variable-focal-length lens system according to an embodiment of the present invention, the space between the second lens group and the third lens group in the wide-angle end state is set appropriately, and as a second feature, the focal length of the second lens group and the focal length of the fourth lens group are set appropriately.

Thus, the variable-focal-length lens system according to an embodiment of the present invention provides high optical performance irrespective of the lens position state, and achieves enhanced performance despite its small size and high zoom ratio.

Specifically, the variable-focal-length lens system according to an embodiment of the present invention has, in order from the object side, a first lens group having positive refractive power, a second lens group having negative refractive power, a third lens group having positive refractive power, a fourth lens group having negative refractive power, and a fifth lens group having positive refractive power, and is configured such that: as the lens position state changes from a wide-angle end state to a telephoto end state, the air space between the first lens group and the second lens group increases, the air space between the second lens group and the third lens group decreases, the air space between the third lens group and the fourth lens group changes, the air space between the fourth lens group and the fifth lens group increases, the first lens group moves monotonously to the object side, the second lens group is fixed in an optical axis direction, and the third lens group and the fourth lens group move to the object side; and the following conditional expressions (1) and (2) are satisfied $$0.2 < D23w/ft < 0.4 \quad (1)$$

$$0.1 < f2/f4 < 0.4 \quad (2)$$

where D23w is the air space between the second lens group and the third lens group in the wide-angle end state, ft is the focal length of the variable-focal-length lens system as a whole in the telephoto end state, f2 is the focal length of the second lens group, and f4 is the focal length of the fourth lens group.

The conditional expression (1) defines the air space between the second lens group and the third lens group in the wide-angle end state, and expresses the first feature described above as a numerical limitation.

That is, in the telephoto end state, the second lens group and the third lens group are located adjacent to each other, and the second lens group is fixed in the optical axis direction when the lens position state changes. Consequently, the air space between the second lens group and the third lens group in the wide-angle end state becomes substantially equal to the amount of movement of the third lens group accompanying a change in lens position state.

In the variable-focal-length lens system according to an embodiment of the present invention, a value above the upper limit of the conditional expression (1) causes off-axis light beams passing through the first lens group and the second lens group to move away from the optical axis. In particular, comatic aberration occurs rapidly around the edges of the picture plane in the wide-angle end state, making it difficult to attain a predetermined optical performance.

A value below the lower limit of the conditional expression (1) causes off-axis light beams passing through the second lens group to move closer to the optical axis, making it difficult to correct on-axis aberration and off-axis aberration at the same time. As a result, it is not possible to correct for variations in off-axis aberration accompanying changes in angle of view in a satisfactory manner.

In the variable-focal-length lens system according to an embodiment of the present invention, a value equal to or lower than the upper limit of the conditional expression (1) makes it possible to attain sufficient optical performance. In this regard, to further bring the off-axis light beams passing through the first lens group closer to the optical axis to achieve a reduction in lens diameter, it is desirable to set the upper limit to "0.35".

The conditional expression (2) is for setting the focal length of the second lens group and the focal length of the fourth lens group appropriately, and expresses the second feature described above as a numerical limitation.

In the variable-focal-length lens system according to an embodiment of the present invention, a value below the lower limit of the conditional expression (2) either causes the refractive power of the second lens group to intensify or causes the refractive power of the fourth lens group to weaken. In the former case, in the variable-focal-length lens system according to an embodiment of the present invention, as described above, the total length of the lens system becomes long and, as a result, it is not possible to achieve sufficient miniaturization.

On the other hand, in the latter case, in the variable-focal-length lens system according to an embodiment of the present invention, it is not possible to correct negative distortion occurring in the wide-angle end state in a satisfactory manner, making it difficult to attain satisfactory image-formation performance.

A value above the upper limit of the conditional expression (2) either causes the refractive power of the second lens group to weaken or causes the refractive power of the fourth lens group to intensify. In the former case, in the variable-focal-length lens system according to an embodiment of the present invention, the refractive power of the second lens group weakens, resulting in an increase in the amount of movement of the first lens group and the third lens group necessary for attaining a predetermined zoom ratio.

As a result, in the wide-angle end state, the first lens group whose amount of movement has increased, and the second lens group that is fixed in the optical axis direction come into interference with each other, or, in the telephoto end state, the second lens group that is fixed in the optical axis direction and the third lens group whose amount of movement has increased come into interference with each other. If this happens, it is no longer possible to keep the second lens group fixed in the optical axis direction, which detracts from the scope of the present invention.

On the other hand, in the latter case, in the variable-focal-length lens system according to an embodiment of the present invention, it is not possible to shorten the total length of the lens system in the telephoto end state, making it difficult to achieve sufficient miniaturization.

The fourth lens group in the variable-focal-length lens system according to an embodiment of the present invention has the action of magnifying a subject's image formed by the first to third lens groups. Consequently, in the variable-focal-length lens system according to an embodiment of the present invention, as the negative refractive power of the fourth lens group becomes stronger, the magnification of the subject's image by the first to third lens groups becomes higher.

As a result, in the variable-focal-length lens system according to an embodiment of the present invention, even image degradation accompanying small eccentricities introduced during manufacture is magnified in the first to third lens group, which makes it difficult to keep stable optical performance at the time of mass production.

Accordingly, in the variable-focal-length lens system according to an embodiment of the present invention, to attain stable optical performance at the time of mass production while keeping the total length of the lens system short, it is desirable to set the upper limit of the conditional expression (2) to "0.3".

In addition, in the variable-focal-length lens system according to an embodiment of the present invention, to attain higher optical performance by suppressing variations in off-axis aberration accompanying changes in lens position state, it is desirable to satisfy the following conditional expression (3):

$$0.3 < |f2|/(fw \cdot ft)^{1/2} < 0.55 \quad (3)$$

where f2 is the focal length of the second lens group, fw is the focal length of the variable-focal-length lens system as a whole in the wide-angle end state, and ft is the focal length of the variable-focal-length lens system as a whole in the telephoto end state.

The conditional expression (3) defines the refractive power of the second lens group. In the variable-focal-length lens system according to an embodiment of the present invention, a value below the lower limit of the conditional expression (3) causes the refractive power of the second lens group to intensify on the negative side. Consequently, it becomes difficult to correct for variations in off-axis aberration that occurs in the second lens group independently as the lens position state changes.

Conversely, in the variable-focal-length lens system according to an embodiment of the present invention, a value above the upper limit of the conditional expression (3) causes an increase in the amount of movement of the first lens group and the third lens group necessary for attaining a predetermined zoom ratio, making it difficult to achieve sufficient shortening of the total length of the lens system.

In addition, in the variable-focal-length lens system according to an embodiment of the present invention, the space between the third lens group and the fourth lens group is changed to thereby suppress variations in off-axis aberration accompanying changes in lens position state. In this regard, it is desirable that the following conditional expression (4) be satisfied to ensure balance between miniaturization and performance enhancement:

$$0.3 < \Delta 4/\Delta 3 < 0.9 \quad (4)$$

where $\Delta 4$ is the amount of movement of the fourth lens group from the wide-angle end state to the telephoto end state, and $\Delta 3$ is the amount of movement of the third lens group from the wide-angle end state to the telephoto end state.

The conditional expression (4) defines the amount of change in the air space between the third lens group and the fourth lens group. In the variable-focal-length lens system according to an embodiment of the present invention, a value below the lower limit of the conditional expression (4) causes the zooming action of the fourth lens group to weaken, which makes it necessary to intensify the zooming action by the other lens groups. As a result, in the variable-focal-length lens system according to an embodiment of the present invention, variations in off-axis aberration accompanying changes in lens position state become disadvantageously large.

Conversely, in the variable-focal-length lens system according to an embodiment of the present invention, a value above the upper limit of the conditional expression (4) causes the air space between the third lens group and the fourth lens group to become narrow in the telephoto end state. Consequently, the back focus becomes longer, resulting in an increase in the total length of the lens system.

Further, in the variable-focal-length lens system according to an embodiment of the present invention, in order to suppress variations in off-axis aberration accompanying changes in lens position state and, at the same time, to reduce the thickness of the second lens group, it is desirable that the second lens group include three lenses that are, in order from the object side, a negative lens L21 whose concave surface faces the image side, a negative lens L22 having a biconcave shape, and a positive lens L23 whose convex surface faces the object side, and that the following conditional expression (5) be satisfied:

$$1 < |f21|/fw < 1.7 \quad (5)$$

where f21 is the focal length of the negative lens L21.

The conditional expression (5) defines the refractive power of the negative lens L21 arranged within the second lens group. In the variable-focal-length lens system according to an embodiment of the present invention, a value below the lower limit of the conditional expression (5) causes off-axis light beams incident on the negative lens L21 of the second lens group to move closer to the optical axis, thereby allowing a reduction in lens diameter.

However, in this case, in the variable-focal-length lens system according to, an embodiment of the present invention, variations in comatic aberration accompanying changes in angle of view in the wide-angle end state become extremely large, making it difficult to achieve sufficient performance enhancement.

Conversely, in the variable-focal-length lens system according to an embodiment of the present invention, a value above the upper limit of the conditional expression (5) causes off-axis light beams incident on the negative lens L21 of the second lens group in the wide-angle end state to move away from the optical axis, that is, causes off-axis light beams incident on the first lens group to greatly move away from the optical axis. Consequently, in the variable-focal-length lens system according to an embodiment of the present invention, comatic aberration that occurs in the first lens group becomes extremely large, making it difficult to achieve sufficient performance enhancement.

Further, in the variable-focal-length lens system according to an embodiment of the present invention, in order to reduce the lens diameter in each lens group, and correct for variations in off-axis aberration accompanying changes in lens position state in a satisfactory manner, it is desirable to arrange an aperture stop near the third lens group.

Generally speaking, in the case when the lens position state changes, the greater the number of lens groups whose distances to the aperture stop change, the more likely the height of off-axis light beams passing through each lens group is to change. Variations in off-axis aberration accompanying changes in lens position state are corrected for by exploiting this height. At this time, actively changing the height of off-axis light beams allows the correction to be performed in a more satisfactory manner.

In particular, in the variable-focal-length lens system according to an embodiment of the present invention, if the aperture stop is arranged near the third lens group, a plurality of movable lens groups can be arranged in a well-balanced manner in front and in rear of the aperture stop. Comatic aberration can be thus corrected in a more satisfactory manner, thereby allowing performance enhancement.

In the variable-focal-length lens system according to an embodiment of the present invention, the aperture stop is arranged in the vicinity of the center of the entire lens system to thereby keep off-axis light beams passing through individual lens groups from becoming too far away in height. As a result, the lens diameter can be reduced.

It should be noted that in the variable-focal-length lens system according to an embodiment of the present invention, the aperture stop is arranged on the object side of the third lens group, and as the lens position state changes, the aperture stop and the third lens group are moved integrally, thereby achieving a further reduction in lens diameter and simplification of the lens-barrel structure.

In the variable-focal-length lens system according to an embodiment of the present invention, by arranging the aperture stop on the object side of the third lens group, in particular, the height of off-axis light beams passing through the first lens group in the wide-angle end state can be brought closer to the optical axis to achieve miniaturization.

At the same time, in the variable-focal-length lens system according to an embodiment of the present invention, since the off-axis light beams passing through the first lens group in the wide-angle end state are brought closer to the optical axis, comatic aberration that occurs around the edges of the picture plane can be suppressed, thereby achieving performance enhancement.

Incidentally, when focusing from a subject located at infinity to a subject located at a short distance (hereinafter, this will be referred to as "close-in focusing"), in the variable-focal-length lens system according to an embodiment of the present invention, it is desirable to move the fifth lens group in the optical axis direction.

This is because since the fifth lens group is arranged at a location close to the image plane position, and on-axis light beams and off-axis light beams pass through the fifth lens group in a state where these light beams are far away from each other, correction can be performed independently for the on-axis light beams and the off-axis light beams, which is suitable for correcting for variations in off-axis aberration accompanying changes in subject's position.

Further, in the variable-focal-length lens system according to an embodiment of the present invention, to achieve reduction of the lens diameter and shortening of the total length of the lens system in a well-balanced manner, it is desirable that the following conditional expression (6) be satisfied:

$$1.8 < f1/(fw \cdot ft)^{1/2} < 2.7 \qquad (6)$$

where f1 is the focal length of the first lens group, fw is the focal length of the variable-focal-length lens system as a whole in the wide-angle end state, and ft is the focal length of the variable-focal-length lens system as a whole in the telephoto end state.

The conditional expression (6) defines the first lens group. In the variable-focal-length lens system according to an embodiment of the present invention, a value above the upper limit of the conditional expression (6) causes the converging action of the first lens group to weaken, resulting in an increase in the total length of the lens system in the telephoto end state.

Conversely, in the variable-focal-length lens system according to an embodiment of the present invention, a value below the lower limit of the conditional expression (6) causes the converging action of the first lens group to intensify. Consequently, off-axis light beams in the wide-angle end state move away from the optical axis, resulting in an increase in lens diameter.

Incidentally, as the refractive power of the first lens group becomes stronger, it becomes more difficult to correct high-order spherical aberration occurring in the first lens group independently in the telephoto end state in a satisfactory manner. In this case, while it is also possible to form the aperture stop as a variable stop so as to change the full aperture as the lens position state changes, this causes problems such as an increase in noise when shooting a subject at low light levels.

For this reason, in the variable-focal-length lens system according to an embodiment of the present invention, in order to correct high-order spherical aberration occurring independently in the first lens group in a more satisfactory manner, and make the full-aperture F value in the telephoto end state bright, it is desirable to set the lower limit of the conditional expression (6) to "2.0".

Further, in the variable-focal-length lens system according to an embodiment of the present invention, in order to correct spherical aberration occurring in the first lens group independently and, in particular, to achieve satisfactory optical performance in the telephoto end state, it is desirable that the first lens group include a cemented lens of a negative lens whose concave surface faces the image side and a positive lens whose convex surface faces the object side.

It is also possible to separate this cemented lens into a negative lens and a positive lens, in which case chromatic aberration or spherical aberration occurring in the first lens group can be corrected in a satisfactory manner in the variable-focal-length lens system according to an embodiment of the present invention.

However, if the cemented lens is separated into a negative lens and a positive lens in the variable-focal-length lens system according to an embodiment of the present invention, small eccentricities introduced during manufacture also cause a significant deterioration in optical performance. For this reason, a cemented lens is more desirable.

Further, in the variable-focal-length lens system according to an embodiment of the present invention, under the above-described configuration of the first lens group, the following conditional expression (7) is satisfied, thereby attaining sufficient optical performance even when the angle of view is widened in the wide-angle end state:

$$0.01 < fw/R13 < 0.12 \qquad (7)$$

where R13 is the curvature radius of the lens surface of the first lens group located on the most image side.

The conditional expression (7) defines the shape of the first lens group. In the variable-focal-length lens system according to an embodiment of the present invention, a value above the upper limit of the conditional expression (7) makes it difficult to correct negative spherical aberration occurring due to the first lens group in the telephoto end state in a satisfactory manner, which in turn makes it difficult to achieve sufficient performance enhancement.

Conversely, in the variable-focal-length lens system according to an embodiment of the present invention, a value below the lower limit of the conditional expression (7) causes off-axis light beams incident on the first lens group to move away from the optical axis, resulting in a state in which off-axis light beams exiting the first lens group are sharply refracted.

As a result, in the variable-focal-length lens system according to an embodiment of the present invention, it is not possible to suppress deterioration in optical performance due to eccentricity of the first lens group and the second lens group relative to each other introduced during manufacture, making it difficult to ensure stable optical quality.

In addition, in the variable-focal-length lens system according to an embodiment of the present invention, aspherical lenses are used to realize further enhanced optical performance. In particular, in the variable-focal-length lens system according to an embodiment of the present invention, by using aspherical lenses in the second lens group, variations in comatic aberration due to the angle of view occurring in the wide-angle end state can be corrected for in a satisfactory manner.

In the variable-focal-length lens system according to an embodiment of the present invention, further enhancement in center performance is possible by introducing aspherical lenses to the third to fifth lens groups. Further, it is needless to mention that in the variable-focal-length lens system according to an embodiment of the present invention, further enhanced optical performance can be attained by using a plurality of aspherical surfaces in a single optical system.

In addition, in the variable-focal-length lens system according to an embodiment of the present invention, the image can be shifted by shifting one of the lens groups constituting the lens system, or some of lenses constituting a single lens group, in a direction substantially perpendicular to the optical axis.

In the variable-focal-length lens system according to an embodiment of the present invention, the lens system is combined with a detection system for detecting the tilt of the camera, computation system for computing the amount of movement on the basis of shake information from the detection system, and a drive system for shifting predetermined lenses in accordance with the amount-of-movement information from the computation system.

Thus, in the variable-focal-length lens system according to an embodiment of the present invention, image blur caused by camera shake occurring at the time of shutter release can be canceled out or mitigated by the lens shift. In particular, in the variable-focal-length lens system according to an embodiment of the present invention, it is possible to reduce changes in performance occurring when the third lens group is shifted in a direction substantially perpendicular to the optical axis.

Further, in the variable-focal-length lens system according to an embodiment of the present invention, if the aperture stop is arranged near the third lens group, off-axis light beams pass in the vicinity of the optical axis, thereby making it possible to suppress variations in off-axis aberration occurring when the third lens group is shifted in a direction substantially perpendicular to the optical axis.

It is needless to mention that in the variable-focal-length lens system according to an embodiment of the present invention, it is of course possible to arrange a low-pass filter on the image side of the lens system to prevent occurrence of so-called moire fringes, or to arrange an infrared-cut-off filter in accordance with the spectral-sensitivity characteristics of light-receiving devices.

2. Numerical Examples

Next, with reference to drawings and tables, a description will be given below of numerical examples in which specific numerical values are applied to the variable-focal-length lens system according to an embodiment of the present invention. In the numerical examples, an aspherical surface is represented by Equation 1 below:

$$x=cy^2/(1+(1-(1+k)c^2y^2)^{1/2})+Ay^4+By^6+ \quad (1)$$

where y denotes the height from the optical axis, x denotes the sag amount, c denotes the curvature, k denotes the conic constant, and A, B, . . . denote aspherical coefficients.

In FIG. 1, reference numeral 1 denotes the refractive power distribution of a variable-focal-length lens system according to each numerical example of the present invention as a whole, including, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In the variable-focal-length lens system 1, when zooming from the wide-angle end state to the telephoto end state, the air space between the first lens group G1 and the second lens group G2 increases, the air space between the second lens group G2 and the third lens group G3 decreases, and the air space between the third lens group G3 and the fourth lens group G4 increases.

At this time, in the variable-focal-length lens system 1, while the first lens group G1, the third lens group G3, and the fourth lens group G4 move to the object side, the second lens group G2 is fixed in the optical axis direction. The fifth lens group G5 moves so as to compensate for variations in image plane position accompanying the movement of each lens group, and moves to the object side at the time of close-range focusing.

2-1. First Numerical Example

Figure 2:
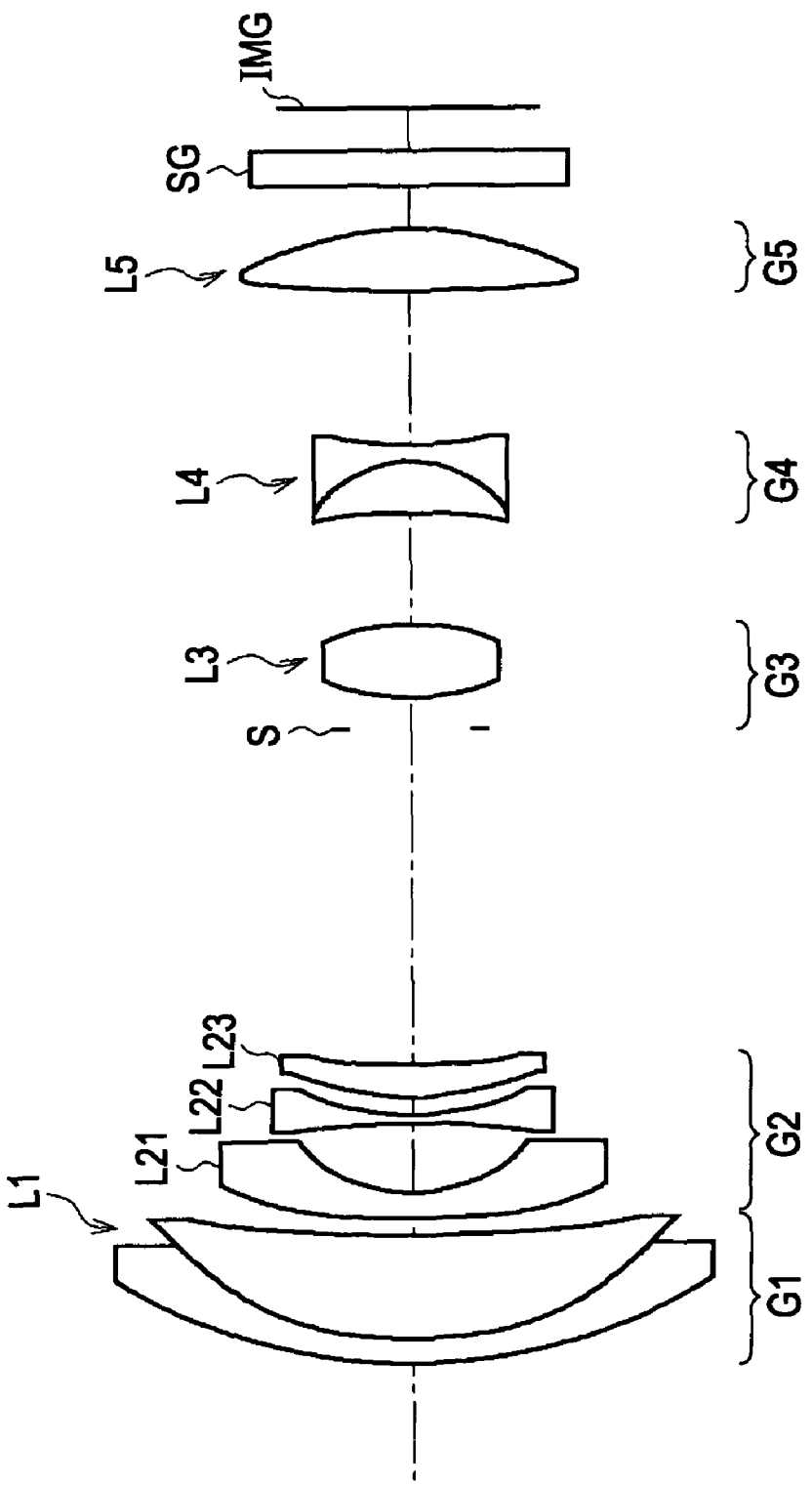
FIG. 2 is a schematic cross sectional view showing the configuration of a variable-focal-length lens system according to a first numerical example.

In FIG. 2, reference numeral 11 denotes a variable-focal-length lens system according to a first numerical example as a whole, which includes, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In the variable-focal-length lens system 11, the first lens group G1 includes a cemented lens L1 of a negative lens having a meniscus shape whose convex surface faces the object side and a positive lens whose convex surface faces the object side.

In addition, in the variable-focal-length lens system 11, the second lens group G2 includes a negative lens L21 having a meniscus shape whose concave surface faces the image side, a negative lens L22 having a biconcave shape, and a positive lens L23 having a meniscus shape whose convex surface faces the object side.

In addition, in the variable-focal-length lens system 11, the third lens group G3 includes a positive lens L3 having a biconvex shape, and the fourth lens group G4 includes a cemented lens L4 of a positive lens having a meniscus shape whose concave surface faces the object side and a negative lens having a meniscus shape whose concave surface faces the object side.

Further, in the variable-focal-length lens system 11, the fifth lens group G5 includes a positive lens L5 having a biconvex shape.

In the variable-focal-length lens system 11, an aperture stop S is arranged near the third lens group G3 and on the object side, and seal glass SG for protecting an image plane IMG is arranged between the fifth lens group G5 and the image plane IMG.

In this way, the variable-focal-length lens system 11 adopts the lens element configuration described above, thereby making it possible to realize higher zoom ratio and wider angle, and to correct various aberrations in the lens system in a satisfactory manner.

Table 1 below lists specifications according to the first numerical example of the present invention. In the specification table according to the first numerical example, "f" denotes focal length, FNO denotes F number, and 2ω denotes angle of view, and the refractive index is for the d-line (wavelength: 587.6 nm). It should be noted that in Table 1, a curvature radius 0 means a flat surface.

TABLE 1

Specifications according to First Numerical Example
f 1.00~3.12~6.59
F NO 3.52~5.55~6.35
2ω 74.14~26.74~12.63°

| Surface number | Curvature radius | Surface separation | Refractive index | Abbe number |
|---|---|---|---|---|
| 1 | 3.3019 | 0.117 | 1.92286 | 20.80 |
| 2 | 1.9925 | 0.702 | 1.83500 | 42.98 |
| 3 | 13.2532 | (D3) | | |
| 4 | 12.6520 | 0.126 | 1.88300 | 40.80 |

TABLE 1-continued

Specifications according to First Numerical Example
f 1.00~3.12~6.59
F NO 3.52~5.55~6.35
2ω 74.14~26.74~12.63°

| Surface number | Curvature radius | Surface separation | Refractive index | Abbe number |
|---|---|---|---|---|
| 5 | 1.1873 | 0.402 | | |
| 6 | −5.1283 | 0.087 | 1.72317 | 53.86 |
| 7 | 1.7476 | 0.106 | | |
| 8 | 1.5905 | 0.191 | 1.94595 | 17.98 |
| 9 | 2.8885 | (D9) | | |
| 10 (aperture stop) | 0.0000 | 0.194 | | |
| 11 | 1.5651 | 0.431 | 1.59201 | 67.05 |
| 12 | −1.8863 | (D12) | | |
| 13 | −5.9528 | 0.313 | 1.88515 | 39.50 |
| 14 | −0.6803 | 0.107 | 1.75520 | 27.53 |
| 15 | 2.5339 | (D15) | | |
| 16 | 9.4104 | 0.348 | 1.61800 | 63.39 |
| 17 | −2.2171 | (D17) | | |
| 18 | 0.0000 | 0.181 | 1.51633 | 64.20 |
| 19 | 0.0000 | (Bf) | | |

It should be noted that the 4th surface, the 5th surface, the 11th surface, the 12th surface, the 15th surface, and the 16th surface are aspherical, and their aspherical coefficients are as shown in Table 2. For example, 0.26029E−05 means $0.26029 \times 10^{-5}$.

TABLE 2

Aspherical Coefficients according to First Numerical Example

| | | | | | |
|---|---|---|---|---|---|
| 4th surface | κ = 0.0000 | A = 0.150416E+00 | B = −0.475468E−01 | C = 0.317622E−02 | D = −0.419138E−02 |
| 5th surface | κ = 0.9046 | A = 0.146891E+00 | B = 0.502663E−01 | C = 0.413334E+00 | D = −0.426043E−01 |
| 11th surface | κ = −1.1038 | A = −0.826855E−01 | B = −0.438730E−01 | C = 0.420582E−01 | D = 0.000000E+00 |
| 12th surface | κ = 0.0000 | A = −0.230199E−01 | B = 0.000000E+00 | C = 0.000000E+00 | D = 0.000000E+00 |
| 15th surface | κ = 0.0000 | A = 0.225214E+00 | B = 0.665918E−01 | C = 0.748884E+00 | D = 0.000000E+00 |
| 16th surface | κ = 0.0000 | A = −0.158512E−01 | B = 0.320069E−01 | C = −0.136418E−01 | D = 0.000000E+00 |

Subsequently, the variable spaces when the lens position state changes in the variable-focal-length lens system 11 are shown in Table 3 below.

TABLE 3

Variable Spaces according to First Numerical Example

| f | 1.000 | 3.117 | 6.592 |
|---|---|---|---|
| D3 | 0.078 | 1.275 | 2.204 |
| D9 | 2.082 | 0.882 | 0.291 |
| D13 | 0.691 | 1.041 | 1.432 |
| D16 | 0.979 | 2.092 | 2.263 |
| D18 | 0.290 | 0.026 | 0.056 |
| BF | 0.274 | 0.274 | 0.274 |

Table 4 below shows values corresponding to conditional expressions in the variable-focal-length lens system 11 according to the first numerical example.

TABLE 4

Values corresponding to Conditional Expressions according to First Numerical Example f2 = −0.982
f4 = −3.883
f1 = 5.559
f21 = −1.492
(1) D23w/ft = 0.316
(2) f2/f4 = 0.253
(3) |f2|/(fw · ft)$^{1/2}$ = 0.382

TABLE 4-continued

Values corresponding to Conditional Expressions according to First Numerical Example (4) Δ4/Δ3 = 0.586 (Δ4 = 1.050, Δ3 = 1.791)
(5) |f21|/fw = 1.492
(6) f1/(fw · ft)$^{1/2}$ = 2.165
(7) fw/R13 = 0.075

Figure 3A:
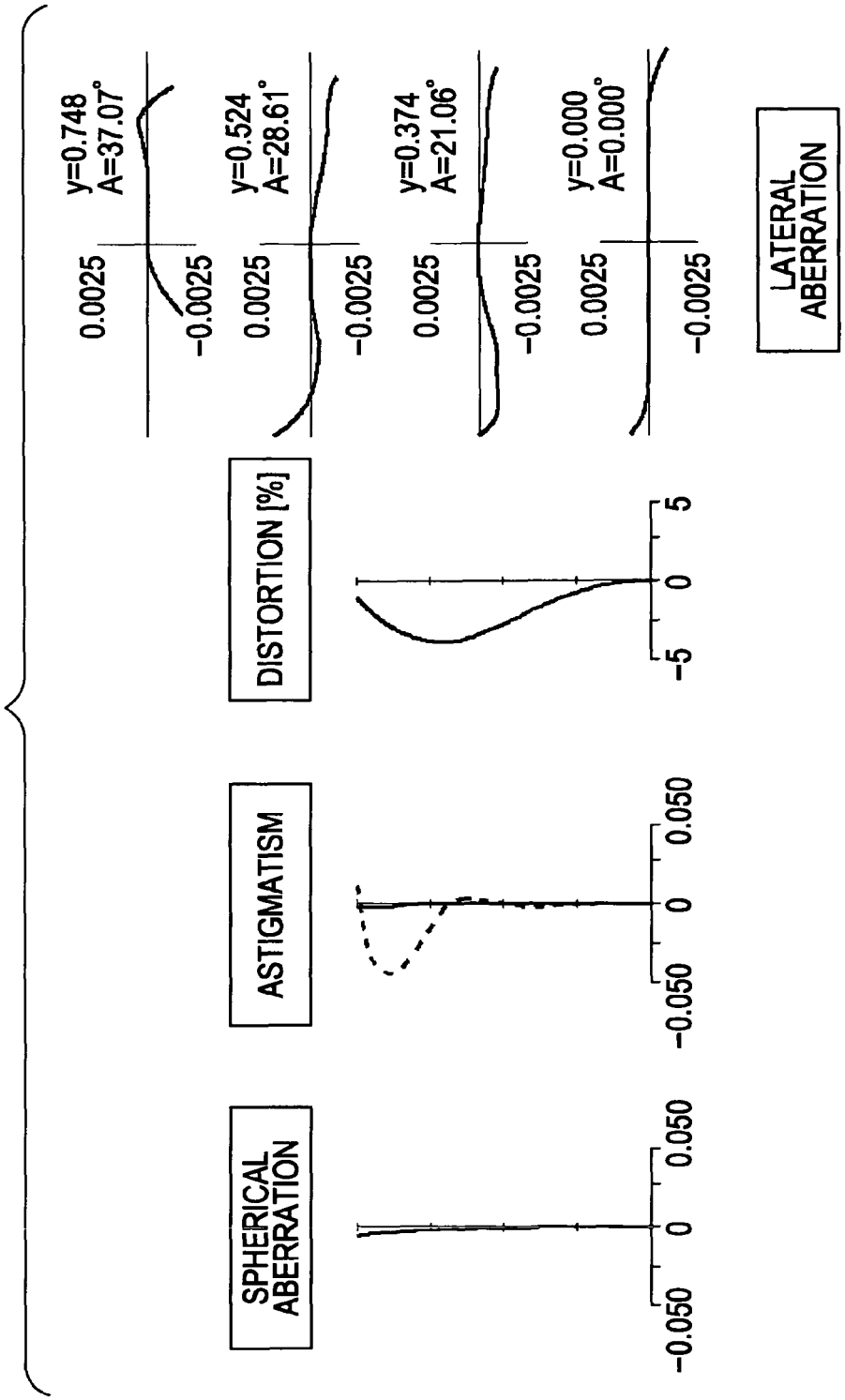
Figure 3B:
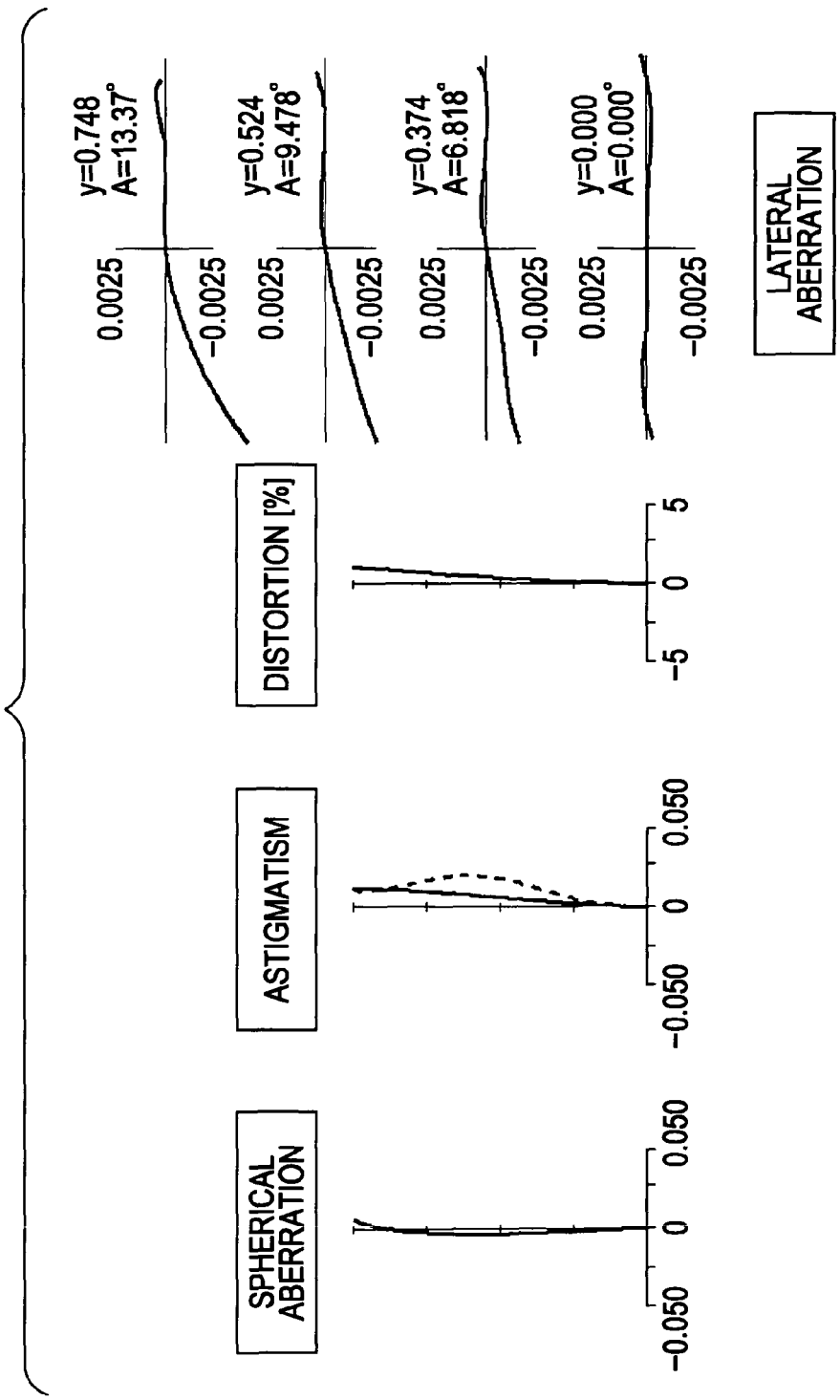
Figure 4:
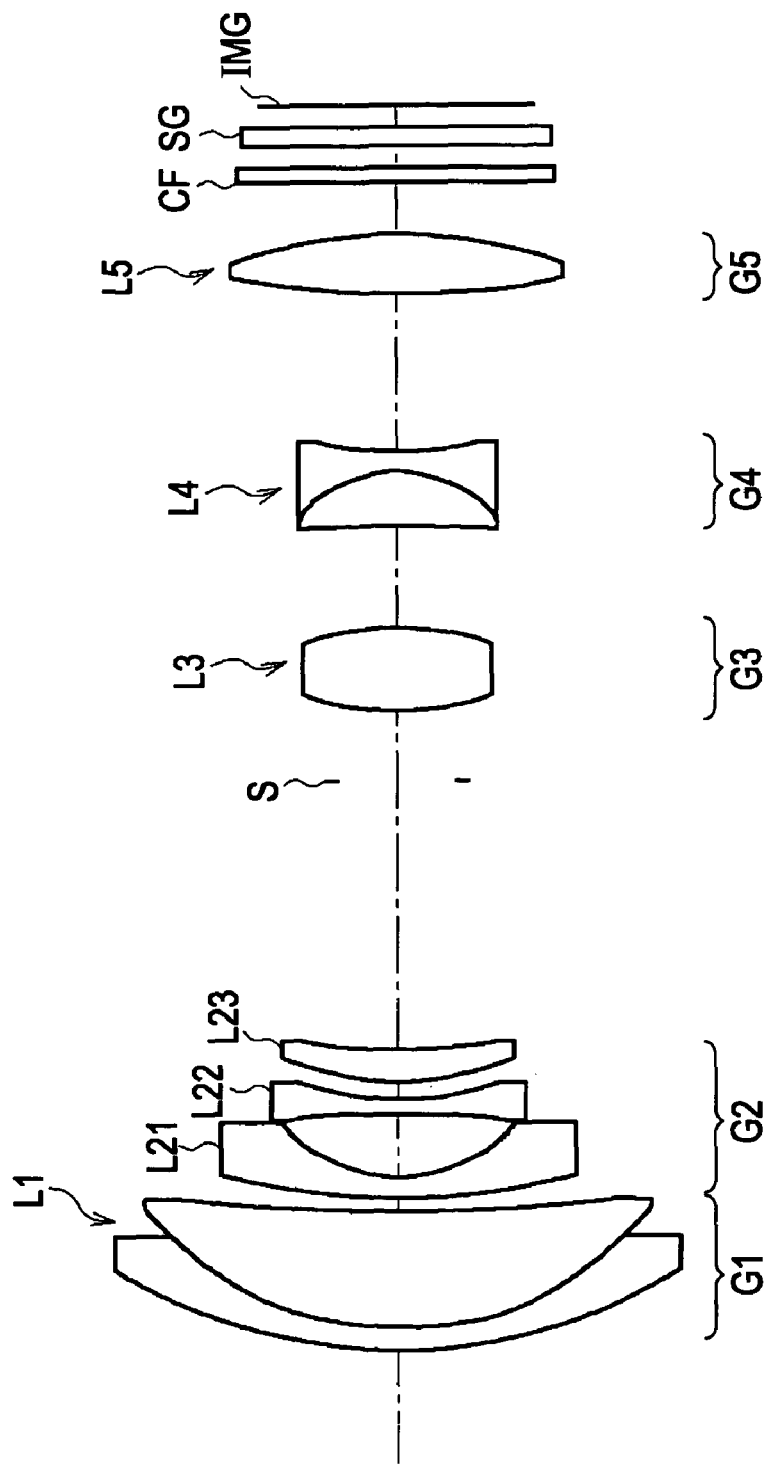
FIG. 4 is a schematic cross sectional view showing the configuration of a variable-focal-length lens system according to a second numerical example.

Subsequently, FIGS. 3A to 3C are each various aberration diagrams when focusing at infinity according to the first numerical example. FIGS. 3A, 3B, and 3C are various aberration diagrams in a wide-angle end state (f=1.000), in an intermediate-focal-length state (f=3.117), and in a telephoto-end state (f=6.592), respectively.

In each of FIGS. 3A to 3C, the solid line in the spherical aberration diagram indicates spherical aberration, the solid line and the broken line in the astigmatism diagram indicates sagittal image plane and meridional image plane, respectively, the solid line in the distortion diagram indicates distortion, and "A" and "y" in the lateral aberration diagram indicate angle of view and image height, respectively. It is apparent from these aberration diagrams that the variable-focal-length lens system 11 according to the first numerical example is corrected for various aberrations in a satisfactory manner, and hence has excellent image-formation performance.

2-2. Second Numerical Example

In FIG. 2, reference numeral 12 denotes a variable-focal-length lens system according to a second numerical example as a whole, which includes, in order from the object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In the variable-focal-length lens system 12, the first lens group G1 includes a cemented lens L1 of a negative lens having a meniscus shape whose convex surface faces the object side and a positive lens whose convex surface faces the object side.

In addition, in the variable-focal-length lens system 12, the second lens group G2 includes a negative lens L21 having a meniscus shape whose concave surface faces the image side, a negative lens L22 having a biconcave shape, and a positive lens L23 having a meniscus shape whose convex surface faces the object side.

In addition, in the variable-focal-length lens system 12, the third lens group G3 includes a positive lens L3 having a biconvex shape, and the fourth lens group G4 includes a cemented lens L4 of a positive lens having a meniscus shape whose concave surface faces the object side and a negative lens having a meniscus shape whose concave surface faces the object side.

Further, in the variable-focal-length lens system 12, the fifth lens group G5 includes a positive lens L5 having a biconvex shape.

In the variable-focal-length lens system 12, an aperture stop S is arranged near the third lens group G3 and on the object side, and an IR cut-off filter CF and seal glass SG for protecting an image plane IMG are arranged between the fifth lens group G5 and the image plane IMG.

In this way, the variable-focal-length lens system 12 adopts the lens element configuration described above, thereby making it possible to realize higher zoom ratio and wider angle, and to correct various aberrations in the lens system in a satisfactory manner.

Table 5 below lists specifications according to the second numerical example of the present invention. In the specification table according to the second numerical example, "f" denotes focal length, FNO denotes F number, and 2ω denotes angle of view, and the refractive index is for the d-line (wavelength: 587.6 nm). It should be noted that in Table 5, a curvature radius 0 means a flat surface.

TABLE 5

Specifications according to Second Numerical Example
f 1.00~2.43~5.65
F NO 3.51~4.61~5.36
2ω 76.44~33.81~14.58°

| Surface number | Curvature radius | Surface separation | Refractive index | Abbe number |
|---|---|---|---|---|
| 1 | 3.0714 | 0.117 | 1.92286 | 20.80 |
| 2 | 1.8622 | 0.688 | 1.83500 | 42.98 |
| 3 | 11.8814 | (D3) | | |
| 4 | 3.8787 | 0.126 | 1.88300 | 40.80 |
| 5 | 0.8935 | 0.370 | | |
| 6 | −5.1604 | 0.087 | 1.75500 | 52.30 |
| 7 | 1.7476 | 0.106 | | |
| 8 | 1.6441 | 0.186 | 1.94595 | 17.98 |
| 9 | 3.3666 | (D9) | | |
| 10 (aperture stop) | 0.0000 | 0.408 | | |
| 11 | 1.5001 | 0.485 | 1.59201 | 67.05 |
| 12 | −1.7442 | (D12) | | |
| 13 | −6.4928 | 0.326 | 1.88300 | 40.80 |
| 14 | −0.7160 | 0.107 | 1.75520 | 27.53 |
| 15 | 2.5339 | (D15) | | |
| 16 | 5.8347 | 0.347 | 1.61800 | 63.39 |
| 17 | −2.6796 | (D17) | | |
| 18 | 0.0000 | 0.181 | 1.51633 | 64.20 |
| 19 | 0.0000 | (Bf) | | |

It should be noted that the 5th surface, the 11th surface, the 12th surface, the 15th surface, and the 16th surface are aspherical, and their aspherical coefficients are as shown in Table 6. For example, 0.26029E−05 means $0.26029 \times 10^{-5}$.

TABLE 6

Aspherical Coefficients according to Second Numerical Example

| | κ | A | B | C | D |
|---|---|---|---|---|---|
| 5th surface | κ = 0.3279 | A = −0.327493E−01 | B = −0.148551E+00 | C = 0.419734E+00 | D = −0.950325E+00 |
| 11th surface | κ = −0.9846 | A = −0.975031E−01 | B = −0.631318E−01 | C = 0.102016E+00 | D = 0.000000E+00 |
| 12th surface | κ = 0.0000 | A = −0.250704E−01 | B = 0.000000E+00 | C = 0.000000E+00 | D = 0.000000E+00 |
| 15th surface | κ = 0.0000 | A = 0.226151E+00 | B = 0.137797E+00 | C = 0.395054E+00 | D = 0.000000E+00 |
| 16th surface | κ = 0.0000 | A = 0.219957E−03 | B = 0.380373E−01 | C = −0.197005E−01 | D = 0.000000E+00 |

Subsequently, the variable spaces when the lens position state changes in the variable-focal-length lens system 12 are shown in Table 7 below.

TABLE 7

Variable Spaces according to Second Numerical Example

| f | 1.000 | 2.525 | 5.651 |
|---|---|---|---|
| D3 | 0.078 | 1.047 | 2.016 |
| D9 | 1.580 | 0.680 | 0.036 |
| D13 | 0.606 | 0.843 | 1.270 |
| D16 | 0.929 | 1.700 | 1.918 |
| D18 | 0.302 | 0.194 | 0.194 |
| BF | 0.274 | 0.274 | 0.274 |

Table 8 below shows values corresponding to conditional expressions in the variable-focal-length lens system 12 according to the second numerical example.

TABLE 8

Values corresponding to Conditional Expressions according to Second Numerical Example f2 = −0.925
f4 = −3.884
f1 = 5.213
f21 = −1.341
(1) D23w/ft = 0.280
(2) f2/f4 = 0.238
(3) $|f2|/(fw \cdot ft)^{1/2}$ = 0.389
(4) Δ4/Δ3 = 0.570 (Δ4 = 0.881, Δ3 = 1.545)
(5) |f21|/fw = 1.341
(6) $f1/(fw \cdot ft)^{1/2}$ = 2.193
(7) fw/R13 = 0.084

Figure 5C:
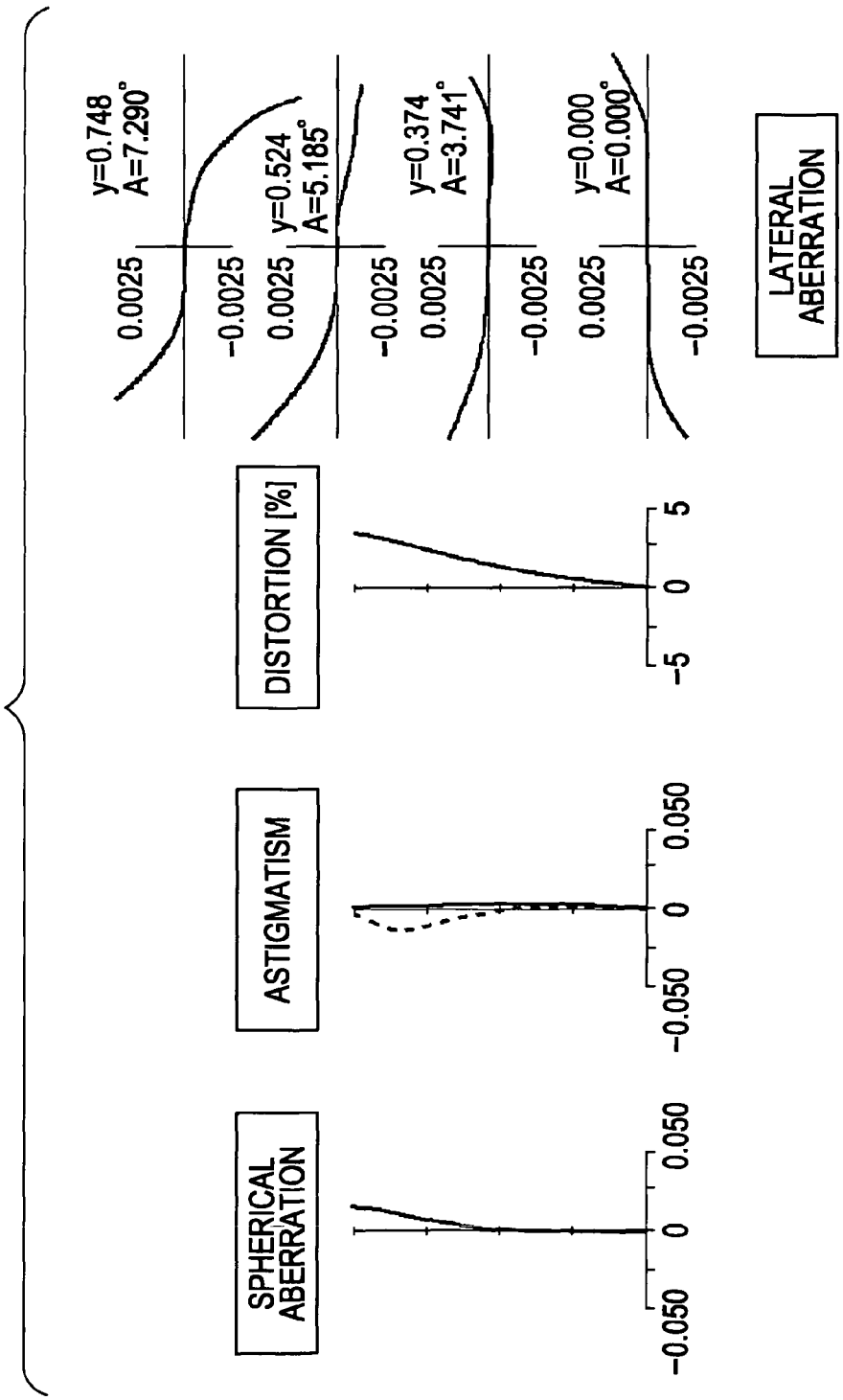

Subsequently, FIGS. 5A to 5C are each various aberration diagrams when focusing at infinity according to the second numerical example. FIGS. 5A, 5B, and 5C are various aberration diagrams in a wide-angle end state (f=1.000), in an intermediate-focal-length state (f=2.525), and in a telephoto-end state (f=5.651), respectively.

In each of FIGS. 5A to 5C, the solid line in the spherical aberration diagram indicates spherical aberration, the solid line and the broken line in the astigmatism diagram indicates sagittal image plane and meridional image plane, respectively, the solid line in the distortion diagram indicates distortion, and "A" and "y" in the lateral aberration diagram indicate angle of view and image height, respectively. It is apparent from these aberration diagrams that the variable-focal-length lens system 12 according to the second numerical example is corrected for various aberrations in a satisfactory manner, and hence has excellent image-formation performance.

2-3. Third Numerical Example

In FIG. 6, reference numeral 13 denotes a variable-focal-length lens system according to a third numerical example as a whole, which includes, in order from the object side, a first lens group G1 having positive refractive power, a third lens group G2 having negative refractive power, a third lens group G3 having positive refractive power, a fourth lens group G4 having negative refractive power, and a fifth lens group G5 having positive refractive power.

In the variable-focal-length lens system 13, the first lens group G1 includes a cemented lens L1 of a negative lens having a meniscus shape whose convex surface faces the object side and a positive lens whose convex surface faces the object side.

In addition, in the variable-focal-length lens system 13, the second lens group G2 includes a negative lens L21 having a meniscus shape whose concave surface faces the image side, a negative lens L22 having a biconcave shape, and a positive lens L23 having a meniscus shape whose convex surface faces the object side.

In addition, in the variable-focal-length lens system 13, the third lens group G3 includes a cemented positive lens L3 of a positive lens having a biconvex shape and a negative lens having a meniscus shape whose concave surface faces the object side.

Further, in the variable-focal-length lens system 13, the fourth lens group G4 includes a cemented lens L4 of a positive lens having a meniscus shape whose concave surface faces the object side and a negative lens having a meniscus shape whose concave surface faces the object side.

Further, in the variable-focal-length lens system 13, the fifth lens group G5 includes a positive lens L5 having a biconvex shape.

In the variable-focal-length lens system 13, an aperture stop S is arranged near the third lens group G3 and on the object side, and an IR cut-off filter CF and seal glass SG for protecting an image plane IMG are arranged between the fifth lens group G5 and the image plane IMG.

In this way, the variable-focal-length lens system 13 adopts the lens element configuration described above, thereby making it possible to realize higher zoom ratio and wider angle, and to correct various aberrations in the lens system in a satisfactory manner.

Table 9 below lists specifications according to the third numerical example of the present invention. In the specification table according to the third numerical example, "f" denotes focal length, FNO denotes F number, and 2ω denotes angle of view, and the refractive index is for the d-line (wavelength: 587.6 nm). It should be noted that in Table 9, a curvature radius 0 means a flat surface.

TABLE 9

Specifications according to Third Numerical Example
f 1.00~2.23~5.18
F NO 3.42~4.40~5.26
2ω 76.44~36.57~15.89°

| Surface number | Curvature radius | Surface separation | Refractive index | Abbe number |
|---|---|---|---|---|
| 1 | 3.0469 | 0.136 | 1.92286 | 20.80 |
| 2 | 1.8692 | 0.649 | 1.83500 | 42.98 |
| 3 | 11.4399 | (D3) | | |
| 4 | 4.9827 | 0.136 | 1.88300 | 40.80 |
| 5 | 0.8774 | 0.363 | | |
| 6 | -5.0344 | 0.097 | 1.75500 | 52.30 |
| 7 | 1.7476 | 0.106 | | |
| 8 | 1.9185 | 0.203 | 1.92286 | 20.80 |
| 9 | 10.8811 | (D9) | | |
| 10 (aperture stop) | 0.0000 | 0.389 | | |
| 11 | 1.6133 | 0.474 | 1.61756 | 63.37 |
| 12 | -0.7767 | 0.097 | 1.55860 | 45.20 |
| 13 | -2.7909 | (D13) | | |
| 14 | -2.7184 | 0.256 | 1.88300 | 40.80 |
| 15 | -1.0095 | 0.087 | 1.84666 | 23.83 |
| 16 | -6.5322 | (D16) | | |
| 17 | 19.4175 | 0.352 | 1.61800 | 63.39 |
| 18 | -2.0230 | (D18) | | |
| 19 | 0.0000 | 0.161 | 1.51633 | 64.20 |
| 20 | 0.0000 | (Bf) | | |

It should be noted that the 5th surface, the 11th surface, the 16th surface, and the 17th surface are aspherical, and their aspherical coefficients are as shown in Table 10. For example, 0.26029E−05 means $0.26029 \times 10^{-5}$.

TABLE 10

Aspherical Coefficients according to Third Numerical Example

| | | | | | |
|---|---|---|---|---|---|
| 5th surface | κ = 0.2358 | A = −0.362278E−01 | B = −0.171370E+00 | C = 0.361696E+00 | D = −0.926748E+00 |
| 11th surface | κ = −2.1529 | A = −0.197512E−01 | B = −0.717410E−02 | C = −0.108141E+00 | D = 0.000000E+00 |
| 16th surface | κ = 0.0000 | A = 0.120955E+00 | B = 0.780125E−01 | C = −0.396449E−01 | D = 0.000000E+00 |
| 17th surface | κ = 0.0000 | A = 0.122750E−01 | B = 0.371070E−02 | C = −0.116457E−01 | D = 0.000000E+00 |

Subsequently, the variable spaces when the lens position state changes in the variable-focal-length lens system 13 are shown in Table 11 below.

TABLE 11

Variable Spaces according to Third Numerical Example

| f | 1.000 | 2.230 | 5.180 |
|---|---|---|---|
| D3 | 0.078 | 1.029 | 1.980 |
| D9 | 1.517 | 0.710 | 0.024 |
| D13 | 0.906 | 1.173 | 1.666 |
| D16 | 0.569 | 1.294 | 1.578 |
| D18 | 0.621 | 0.436 | 0.345 |
| BF | 0.136 | 0.136 | 0.136 |

Table 12 below shows values corresponding to conditional expressions in the variable-focal-length lens system 13 according to the third numerical example.

TABLE 12

Values corresponding to Conditional Expressions
according to Third Numerical Example f2 = −1.002
f4 = −6.661
f1 = 5.206
f21 = −1.225
(1) D23w/ft = 0.292
(2) f2/f4 = 0.150
(3) $|f2|/(fw \cdot ft)^{1/2}$ = 0.440
(4) Δ4/Δ3 = 0.491 (Δ4 = 0.733, Δ3 = 1.493)
(5) |f21|/fw = 1.225
(6) $f1/(fw \cdot ft)^{1/2}$ = 2.193
(7) fw/R13 = 0.087

Figure 7C:
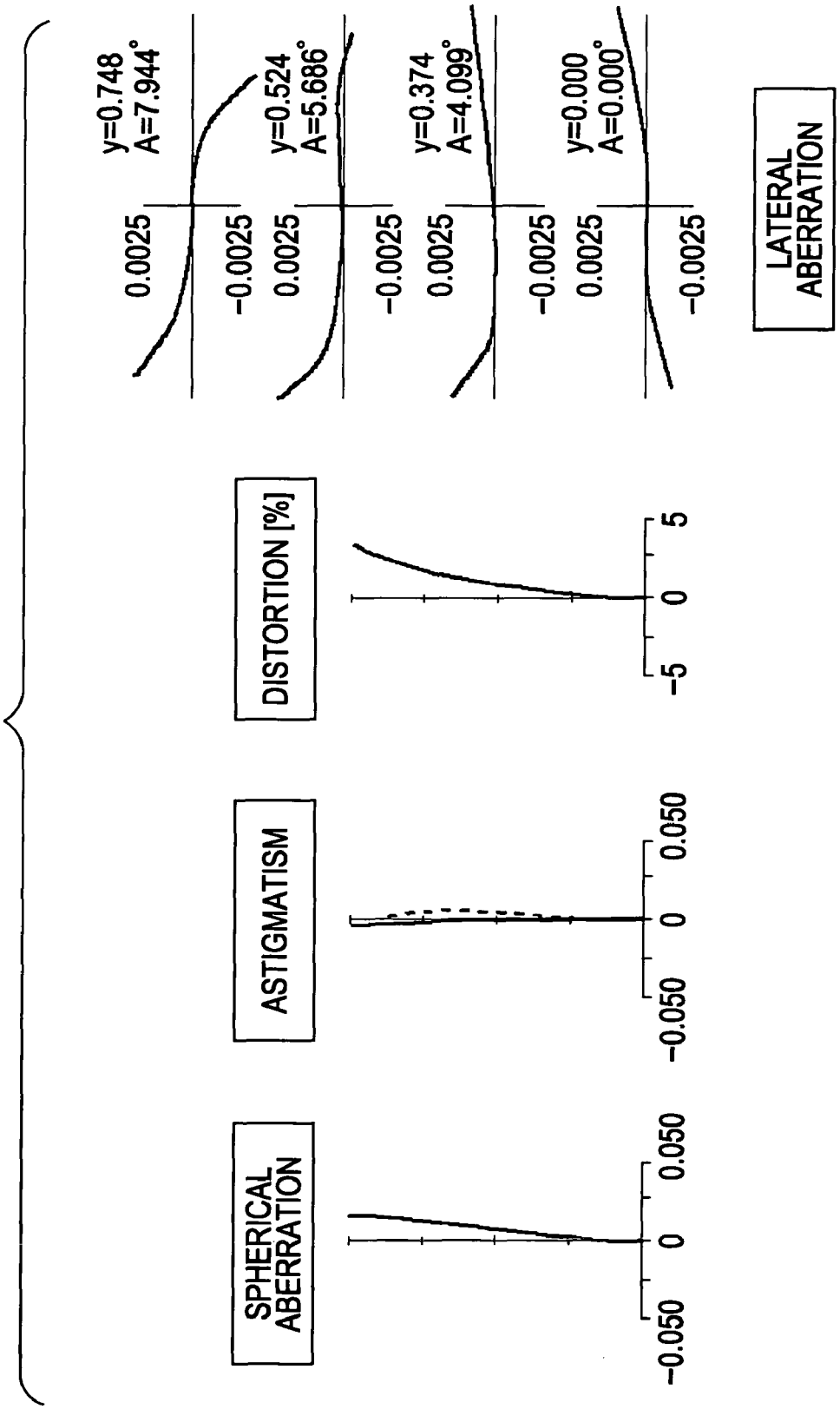

Subsequently, FIGS. 7A to 7C are each various aberration diagrams when focusing at infinity according to the third numerical example. FIGS. 7A, 7B, and 7C are various aberration diagrams in a wide-angle end state (f=1.000), in an intermediate-focal-length state (f=2.230), and in a telephoto-end state (f=5.180), respectively.

In each of FIGS. 7A to 7C, the solid line in the spherical aberration diagram indicates spherical aberration, the solid line and the broken line in the astigmatism diagram indicates sagittal image plane and meridional image plane, respectively, the solid line in the distortion diagram indicates distortion, and "A" and "y" in the lateral aberration diagram indicate angle of view and image height, respectively. It is apparent from these aberration diagrams that the variable-focal-length lens system 13 according to the third numerical example is corrected for various aberrations in a satisfactory manner, and hence has excellent image-formation performance.

2-4. Fourth Numerical Example

In FIG. 8, reference numeral 14 denotes a variable-focal-length lens system according to a fourth numerical example as a whole, which includes, in order from the object side, a first lens group G1 having positive refractive power, a fourth lens group G2 having negative refractive power, a fourth lens group G3 having positive refractive power, a fourth lens group G4 having negative refractive power, and a fifth lens group G5 having positive refractive power.

In the variable-focal-length lens system 14, the first lens group G1 includes a cemented lens L11 of a negative lens having a meniscus shape whose convex surface faces the object side and a positive lens whose convex surface faces the object side, and a positive lens L12 having a meniscus shape which is arranged on the image side of the cemented lens L11 and whose convex surface faces the object side.

In addition, in the variable-focal-length lens system 14, the second lens group G2 includes a negative lens L21 having a meniscus shape whose concave surface faces the image side, a negative lens L22 having a biconcave shape, and a positive lens L23 having a meniscus shape whose convex surface faces the object side.

In addition, in the variable-focal-length lens system 14, the third lens group G3 includes a cemented positive lens L3 of a positive lens having a biconvex shape and a negative lens having a meniscus shape whose concave surface faces the object side.

Furthermore, in the variable-focal-length lens system 14, the fourth lens group G4 includes a negative lens L4 having a meniscus shape whose convex surface faces the object side.

Further, in the variable-focal-length lens system 14, the fifth lens group G5 includes a positive lens L5 having a biconvex shape.

In the variable-focal-length lens system 14, an aperture stop S is arranged near the third lens group G3 and on the object side, and an IR cut-off filter CF and seal glass SG for protecting an image plane IMG are arranged in a state cemented to each other between the fifth lens group G5 and the image plane IMG.

In this way, the variable-focal-length lens system 14 adopts the lens element configuration described above, thereby making it possible to realize higher zoom ratio and wider angle, and to correct various aberrations in the lens system in a satisfactory manner.

Table 13 below lists specifications according to the fourth numerical example of the present invention. In the specification table according to the fourth numerical example, "f" denotes focal length, FNO denotes F number, and 2ω denotes angle of view, and the refractive index is for the d-line (wavelength: 587.6 nm). It should be noted that in Table 13, a curvature radius 0 means a flat surface.

TABLE 13

Specifications according to Fourth Numerical Example
f 1.00~2.90~11.28
F NO 3.59~4.94~6.02
2ω 86.85~31.12~8.11°

| Surface number | Curvature radius | Surface separation | Refractive index | Abbe number |
|---|---|---|---|---|
| 1 | 6.9807 | 0.158 | 1.84666 | 23.83 |
| 2 | 4.8125 | 0.767 | 1.49700 | 81.60 |
| 3 | 26.6325 | 0.023 | | |
| 4 | 5.5250 | 0.533 | 1.75500 | 52.30 |
| 5 | 16.9137 | (D5) | | |
| 6 | 112.7583 | 0.158 | 1.88300 | 40.80 |
| 7 | 1.3490 | 0.690 | | |
| 8 | −1.9760 | 0.101 | 1.51633 | 64.20 |
| 9 | 5.1421 | 0.045 | | |
| 10 | 3.1777 | 0.451 | 1.94595 | 17.98 |
| 11 | 99.1200 | (D11) | | |
| 12 (aperture stop) | 0.0000 | 0.090 | | |
| 13 | 2.8025 | 0.789 | 1.61800 | 63.40 |
| 14 | −0.9854 | 0.090 | 1.71736 | 29.50 |
| 15 | −1.8002 | (D15) | | |
| 16 | 3.2131 | 0.113 | 1.90366 | 31.13 |
| 17 | 2.0297 | (D17) | | |
| 18 | 3.3437 | 0.439 | 1.55332 | 71.68 |
| 19 | −11.2758 | (D19) | | |
| 20 | 0.0000 | 0.210 | 1.51633 | 64.20 |
| 21 | 0.0000 | (Bf) | | |

It should be noted that the 7th surface, the 8th surface, the 13th surface, the 18th surface, and the 19th surface are aspherical, and their aspherical coefficients are as shown in Table 14. For example, 0.26029E−05 means 0.26029×10$^{-5}$.

TABLE 14

Aspherical Coefficients according to Fourth Numerical Example

| | | | | | |
|---|---|---|---|---|---|
| 7th surface | κ = 0.0000 | A = 0.713504E−01 | B = −0.179568E−01 | C = 0.000000E+00 | D = 0.000000E+00 |
| 8th surface | κ = −1.8730 | A = 0.175765E+00 | B = 0.518883E−01 | C = 0.724655E−01 | D = 0.319983E−01 |
| 13th surface | κ = −3.5846 | A = −0.340076E−01 | B = 0.641509E−01 | C = −0.205333E+00 | D = 0.304004E+00 |
| 18th surface | κ = −10.0000 | A = 0.654760E−01 | B = −0.318486E−01 | C = −0.239076E−01 | D = 0.467604E−02 |
| 19th surface | κ = 0.0000 | A = 0.589257E−01 | B = −0.660123E−01 | C = −0.000000E+00 | D = 0.000000E+00 |

Subsequently, the variable spaces when the lens position state changes in the variable-focal-length lens system 14 are shown in Table 15 below.

TABLE 15

Variable Spaces according to Fourth Numerical Example

| f | 1.000 | 2.905 | 11.283 |
|---|---|---|---|
| D3 | 0.079 | 2.236 | 4.777 |
| D9 | 2.886 | 1.249 | 0.068 |
| D13 | 0.763 | 0.661 | 0.383 |
| D16 | 0.820 | 2.475 | 4.171 |
| D18 | 0.908 | 0.992 | 0.755 |
| BF | 0.183 | 0.183 | 0.183 |

Table 16 below shows values corresponding to conditional expressions in the variable-focal-length lens system 14 according to the fourth numerical example.

TABLE 16

Figure 9B:
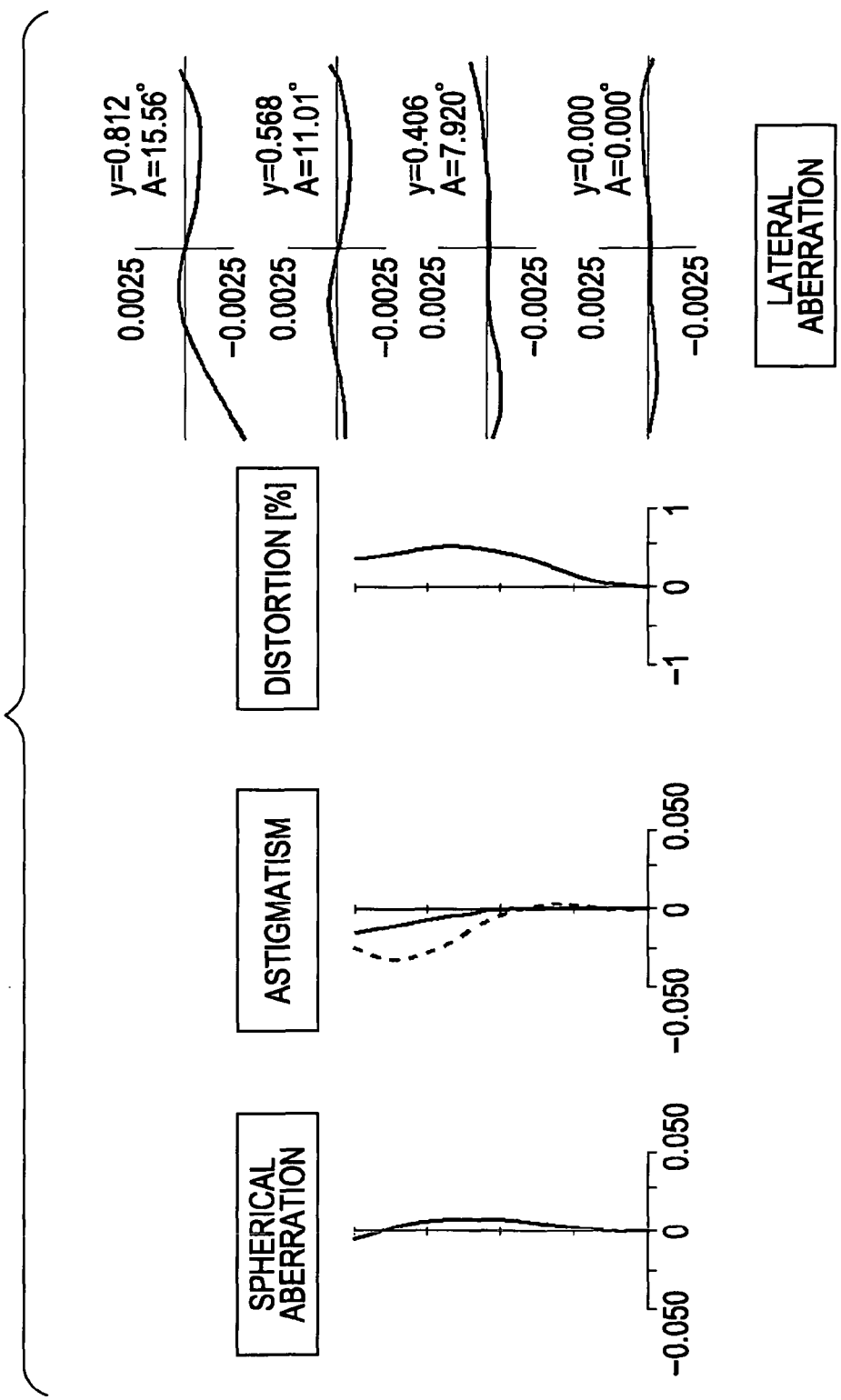

Values corresponding to Conditional Expressions according to Fourth Numerical Example $f2 = -1.376$
$f4 = -6.387$
$f1 = 8.179$
$f21 = -1.547$
(1) $D23w/ft = 0.250$
(2) $f2/f4 = 0.215$
(3) $|f2|/(fw \cdot ft)^{1/2} = 0.461$
(4) $\Delta4/\Delta3 = 1.135$ ($\Delta4 = 3.198$, $\Delta3 = 2.818$)
(5) $|f21|/fw = 1.225$
(6) $f1/(fw \cdot ft)^{1/2} = 2.435$
(7) $fw/R13 = 0.038$ Subsequently, FIGS. 9A to 9C are each various aberration diagrams when focusing at infinity according to the fourth numerical example. FIGS. 9A, 9B, and 9C are various aberration diagrams in a wide-angle end state (f=1.000), in an intermediate-focal-length state (f=2.905), and in a telephoto-end state (f=11.283), respectively.

In each of FIGS. 9A to 9C, the solid line in the spherical aberration diagram indicates spherical aberration, the solid line and the broken line in the astigmatism diagram indicates sagittal image plane and meridional image plane, respectively, the solid line in the distortion diagram indicates distortion, and "A" and "y" in the lateral aberration diagram indicate angle of view and image height, respectively. It is apparent from these aberration diagrams that the variable-focal-length lens system 14 according to the fourth numerical example is corrected for various aberrations in a satisfactory manner, and hence has excellent image-formation performance.

3. Imaging Apparatus and Digital Still Camera

3-1. Configuration of Imaging Apparatus

Next, an imaging apparatus according to an embodiment of the present invention will be described. The imaging apparatus includes the variable-focal-length lens system 1 (or 11, 12, 13, 14) according to an embodiment of the present invention, and an imaging device formed by, for example, a CCD (Charge Coupled Device) sensor or a CMOS (Complementary Metal Oxide Semiconductor) sensor for converting an optical image formed by the variable-focal-length lens system 1 into an electrical signal.

The variable-focal-length lens system 1 (FIG. 1) has, in order from the object side, the first lens group G1 having positive refractive power, the second lens group G2 having negative refractive power, the third lens group G3 having positive refractive power, the fourth lens group G4 having negative refractive power, and the fifth lens group G5 having positive refractive power.

Specifically, the variable-focal-length lens system 1 is configured in such a way that when the lens position state changes from the wide-angle end to the telephone end, the air space between the first lens group G1 and the second lens group G2 increases, the air space between the second lens group G2 and the third lens group G3 decreases, the air space between the third lens group G3 and the fourth lens group G4 changes, the air space between the fourth lens group G4 and the fifth lens group G5 increases, the first lens group G1 moves monotonously to the object side, the second lens group G2 is fixed in the optical axis direction, and the third lens group G3 and the fourth lens group G4 move to the object side.

Further, the variable-focal-length lens system 1 is configured in such a way that the fifth lens G5 is separately driven to move so as to compensate for variations in image plane position caused by movement of the first lens group G1, the third lens group G3, and the fourth lens group G4.

In the variable-focal-length lens system 1, by fixing the second lens group G2 in the optical axis direction from the wide-angle end state to the telephoto end state, the variable spaces between individual lens groups can be increased while reducing the number of variable lens groups from five to four, thereby making it possible to achieve miniaturization by simplifying the overall configuration of the lens system and also achieve higher zoom ratio.

In the variable-focal-length lens system 1, in the wide-angle end state, by arranging the first lens group G1 and the second lens group G2 in close proximity to each other, it is possible to keep off-axis light beams incident on the first lens group G1 from moving away the optical axis, thereby achieving a reduction in lens diameter.

This is because since the first lens group G1 has positive refractive power, the first lens group G1 bends light strongly, resulting in an increase in the angle formed. Consequently, as the distance between the first lens group G1 and the second lens group G2 becomes greater, the off-axis light beams having passed through the first lens group G1 spread out more.

At the same time, in the variable-focal-length lens system 1 according to an embodiment of the present invention, as the lens position state changes toward the telephoto end state, the air space between the first lens group G1 and the second lens group G2 is widened. Consequently, off-axis light beams passing through the first lens group G1 move away from the optical axis, and by exploiting the resulting change in height, variations in off-axis aberration accompanying changes in lens position state are corrected for in a satisfactory manner.

In particular, in the variable-focal-length lens system 1, the total lens length is varied to be shorter in the wide-angle end state and longer in the telephoto end state, thereby keeping off-axis light beams incident on the first lens group G1 in the wide-angle end state with a wide angle of view from moving too far away from the optical axis.

Further, in the variable-focal-length lens system 1, by widening the air space between the second lens group G2 and the third lens group G3 in the wide-angle end state, off-axis light beams passing through the second lens group G2 can be moved farther away from the optical axis, thereby making it possible to correct on-axis aberration and off-axis aberration independently.

Further, in the variable-focal-length lens system 1, as the lens position state changes toward the telephoto end state, the air space between the second lens group G2 and the third lens group G3 is narrowed, thereby bringing off-axis light beams passing through the second lens group G2 closer to the optical axis. Consequently, variations in off-axis aberration accompanying changes in lens position state can be corrected for in a satisfactory manner for enhanced performance.

At this time, in the variable-focal-length lens system 1, the second lens group G2 is fixed in the optical axis direction and, at the same time, in order to correct for variations in off-axis aberration accompanying changes in lens position state in a satisfactory manner, the air space between the third lens group G3 and the fourth lens group G4 is changed.

Further, in the variable-focal-length lens system 1, the fifth lens group is moved in accordance with changes in lens position state so as to compensate for variations in image plane position, thereby correcting for variations in off-axis aberration accompanying changes in lens position state in a more satisfactory manner.

It should be noted that in the variable-focal-length lens system 1, the fourth lens group G4 having negative refractive power and the fifth lens group G5 having positive refractive power are arranged on the image side of the third lens group G3. By arranging two negative lens groups, the second lens group G2 and the fourth lens group G4, the overall refractive power arrangement of the lens system is made closer to symmetrical, thereby correcting negative distortion and magnification chromatic aberration, which are particularly liable to occur in the wide-angle end state, in a satisfactory manner.

However, in the variable-focal-length lens system 1, since the second lens group G2 is fixed in the optical axis direction, the degree of freedom in the selection of a zoom track decreases, which gives rise to two problems.

The first problem is that it is not possible to correct for variations in various aberrations that occur as the lens position state changes, and the second problem is that it is not possible to achieve sufficient miniaturization. Generally speaking, miniaturization is classified into reduction of the lens diameter and shortening of the total lens length, of which the shortening of the total lens length becomes a problem in the present invention.

With respect to the first problem, in the variable-focal-length lens system 1, the zooming action of the second lens group G2 is weakened to thereby correct for variations in various aberrations in a satisfactory manner. However, since simply weakening the zooming action of the second lens group G2 results in a decrease in the overall zoom ratio of the lens system, in the variable-focal-length lens system 1, the zooming action of the third lens group G3 is enhanced to thereby attain a predetermined zoom ratio.

More specifically, a predetermined zoom ratio can be attained by either increasing the amount of movement of the third lens group G3 or intensifying the refractive power of the third lens group G3. However, if the refractive power is intensified, it is not possible to correct negative spherical aberration occurring in the third lens group G3 in a satisfactory manner.

Accordingly, in the variable-focal-length lens system 1, the amount of movement of the third lens group G3 is increased for enhanced zooming action, thereby achieving high optical performance while attaining a predetermined zoom ratio. It should be noted that enhancing the zooming action means increasing the amount of change in lateral magnification between the wide-angle end state and the telephoto end state.

On the other hand, with respect to the second problem, in the variable-focal-length lens system 1, the refractive power of the second lens group G2 having negative refractive power is weakened for weaker diverging action. As a result, the overall length of the lens system can be shortened.

It should be noted that in the variable-focal-length lens system 1, to achieve miniaturization in a more effective way, the refractive power of the second lens group G2 having negative refractive power is weakened, and the refractive power of the fourth lens group G4 having negative refractive power is intensified, thereby making it possible to achieve further shortening of focal length in the first to third lens groups G1 to G3.

However, the variable-focal-length lens system 1 has a problem in that, if the refractive power of the fourth lens group G4 is intensified excessively, it is not possible to set the exit pupil position to an appropriate position, or if the refractive power of the second lens group G2 is weakened excessively, off-axis light beams incident on the first lens group G1 in the wide-angle end state move away from the optical axis, which detracts from reduction of the lens diameter.

For the above reasons, as a first feature of the variable-focal-length lens system 1, the space between the second lens group G2 and the third lens group G3 in the wide-angle end state is set appropriately, and as a second feature, the focal length of the second lens group G2 and the focal length of the fourth lens group G4 are set appropriately.

Thus, the variable-focal-length lens system 1 provides high optical performance irrespective of the lens position state, and achieves enhanced performance despite its small size and high zoom ratio.

Specifically, the variable-focal-length lens system 1 has, in order from the object side, the first lens group G1 having positive refractive power, the second lens group G2 having negative refractive power, the third lens group G3 having positive refractive power, the fourth lens group G4 having negative refractive power, and the fifth lens group G5 having positive refractive power, and is configured such that: as the lens position state changes from the wide-angle end state to the telephoto end state, the air space between the first lens group G1 and the second lens group G2 increases, the air space between the second lens group G2 and the third lens group G3 decreases, the air space between the third lens group G3 and the fourth lens group G4 changes, the air space between the fourth lens group G4 and the fifth lens group G5 increases, the first lens group G1 moves monotonously to the object side, the second lens group G2 is fixed in the optical axis direction, and the third lens group G3 and the fourth lens group G4 move to the object side; and the following conditional expressions (1) and (2) are satisfied $$0.2 < D23w/ft < 0.4 \quad (1)$$

$$0.1 < f2/f4 < 0.4 \quad (2)$$

where D23w is the air space between the second lens group G2 and the third lens group G3 in the wide-angle end state, ft is the focal length of the variable-focal-length lens system as a whole in the telephoto end state, f2 is the focal length of the second lens group G2, and f4 is the focal length of the fourth lens group G4.

The conditional expression (1) defines the air space between the second lens group G2 and the third lens group G3 in the wide-angle end state, and expresses the first feature described above as a numerical limitation.

That is, in the telephoto end state, the second lens group G2 and the third lens group G3 are located adjacent to each other, and the second lens group G2 is fixed in the optical axis direction when the lens position state changes. Consequently, the air space between the second lens group G2 and the third lens group G3 in the wide-angle end state becomes substantially equal to the amount of movement of the third lens group G3 accompanying a change in lens position state.

In the variable-focal-length lens system 1 according to an embodiment of the present invention, a value above the upper limit of the conditional expression (1) causes off-axis light beams passing through the first lens group G1 and the second lens group G2 to move away from the optical axis. In particular, comatic aberration occurs rapidly around the edges of the picture plane in the wide-angle end state, making it difficult to attain a predetermined optical performance.

A value below the lower limit of the conditional expression (1) causes off-axis light beams passing through the second lens group G2 to move closer to the optical axis, making it difficult to correct on-axis aberration and off-axis aberration at the same time. As a result, it is not possible to correct for variations in off-axis aberration accompanying changes in angle of view in a satisfactory manner.

In the variable-focal-length lens system 1, a value equal to or lower than the upper limit of the conditional expression (1) makes it possible to attain sufficient optical performance. In this regard, to further bring the off-axis light beams passing through the first lens group G1 closer to the optical axis to achieve a reduction in lens diameter, it is desirable to set the upper limit to "0.35".

The conditional expression (2) is for setting the focal length of the second lens group G2 and the focal length of the fourth lens group G4 appropriately, and expresses the second feature described above as a numerical limitation.

In the variable-focal-length lens system 1 according to an embodiment of the present invention, a value below the lower limit of the conditional expression (2) either causes the refractive power of the second lens group G2 to intensify or causes the refractive power of the fourth lens group G4 to weaken. In the former case, in the variable-focal-length lens system according to an embodiment of the present invention, as described above, the total length of the lens system becomes long and, as a result, it is not possible to achieve sufficient miniaturization.

On the other hand, in the latter case, in the variable-focal-length lens system 1 according to an embodiment of the present invention, it is not possible to correct negative distortion occurring in the wide-angle end state in a satisfactory manner, making it difficult to attain satisfactory image-formation performance.

A value above the upper limit of the conditional expression (2) either causes the refractive power of the second lens group G2 to weaken or causes the refractive power of the fourth lens group G4 to intensify. In the former case, in the variable-focal-length lens system 1, the refractive power of the second lens group G2 weakens, resulting in an increase in the amount of movement of the first lens group G1 and the third lens group G3 necessary for attaining a predetermined zoom ratio.

As a result, in the wide-angle end state, the first lens group G1 whose amount of movement has increased, and the second lens group G2 that is fixed in the optical axis direction come into interference with each other, or, in the telephoto end state, the second lens group G2 that is fixed in the optical axis direction and the third lens group G3 whose amount of movement has increased come into interference with each other. If this happens, it is no longer possible to keep the second lens group G2 fixed in the optical axis direction, which detracts from the scope of the present invention.

On the other hand, in the latter case, in the variable-focal-length lens system 1, it is not possible to shorten the total length of the lens system in the telephoto end state, making it difficult to achieve sufficient miniaturization.

The fourth lens group G4 in the variable-focal-length lens system 1 has the action of magnifying a subject's image formed by the first to third lens groups G1 to G3. Consequently, in the variable-focal-length lens system 1, as the negative refractive power of the fourth lens group G4 becomes stronger, the magnification of the subject's image by the first to third lens groups G1 to G3 becomes higher.

As a result, in the variable-focal-length lens system 1, even image degradation accompanying small eccentricities introduced during manufacture is magnified in the first to third lens group G1 to G3, which makes it difficult to keep stable optical performance at the time of mass production.

Accordingly, in the variable-focal-length lens system 1, to attain stable optical performance at the time of mass production while keeping the total length of the lens system short, it is desirable to set the upper limit of the conditional expression (2) to "0.3".

In addition, in the variable-focal-length lens system 1, to attain higher optical performance by suppressing variations in off-axis aberration accompanying changes in lens position state, it is desirable to satisfy the following conditional expression (3):

$$0.3<|f2|/(fw \cdot ft)^{1/2}<0.55 \qquad (3)$$

where f2 is the focal length of the second lens group G2, fw is the focal length of the variable-focal-length lens system as a whole in the wide-angle end state, and ft is the focal length of the variable-focal-length lens system as a whole in the telephoto end state.

The conditional expression (3) defines the refractive power of the second lens group G2. In the variable-focal-length lens system 1, a value below the lower limit of the conditional expression (3) causes the refractive power of the second lens group G2 to intensify on the negative side. Consequently, it becomes difficult to correct for variations in off-axis aberration that occurs in the second lens group G2 independently as the lens position state changes.

Conversely, in the variable-focal-length lens system 1, a value above the upper limit of the conditional expression (3) causes an increase in the amount of movement of the first lens group G1 and the third lens group G3 necessary for attaining a predetermined zoom ratio, making it difficult to achieve sufficient shortening of the total length of the lens system.

In addition, in the variable-focal-length lens system 1, the air space between the third lens group G3 and the fourth lens group G4 is changed to thereby suppress variations in off-axis aberration accompanying changes in lens position state. In this regard, it is desirable that the following conditional expression (4) be satisfied to ensure balance between miniaturization and performance enhancement:

$$0.3<\Delta 4/\Delta 3<0.9 \qquad (4)$$

where $\Delta 4$ is the amount of movement of the fourth lens group G4 from the wide-angle end state to the telephoto end state, and $\Delta 3$ is the amount of movement of the third lens group G3 from the wide-angle end state to the telephoto end state The conditional expression (4) defines the amount of change in the air space between the third lens group G3 and the fourth lens group G4. In the variable-focal-length lens system 1, a value below the lower limit of the conditional expression (4) causes the zooming action of the fourth lens group G4 to weaken, which makes it necessary to intensify the zooming action by the other lens groups. As a result, in the variable-focal-length lens system 1, variations in off-axis aberration accompanying changes in lens position state become disadvantageously large.

Conversely, in the variable-focal-length lens system 1, a value above the upper limit of the conditional expression (4) causes the air space between the third lens group G3 and the fourth lens group G4 to become narrow in the telephoto end state. Consequently, the back focus becomes longer, resulting in an increase in the total length of the lens system.

Further, in the variable-focal-length lens system 1, in order to suppress variations in off-axis aberration accompanying changes in lens position state and, at the same time, to reduce the thickness of the second lens group G2, it is desirable that the second lens group G2 include three lenses that are, in order from the object side, the negative lens L21 whose concave surface faces the image side, the negative lens L22 having a biconcave shape, and the positive lens L23 whose convex surface faces the object side, and that the following conditional expression (5) be satisfied:

$$1<|f21|/fw<1.7 \qquad (5)$$

where f21 is the focal length of the negative lens L21.

The conditional expression (5) defines the refractive power of the negative lens L21 arranged within the second lens group G2. In the variable-focal-length lens system 1, a value below the lower limit of the conditional expression (5) causes off-axis light beams incident on the negative lens L21 of the second lens group G2 to move closer to the optical axis, thereby allowing a reduction in lens diameter.

However, in this case, in the variable-focal-length lens system 1, variations in comatic aberration accompanying changes in angle of view in the wide-angle end state become extremely large, making it difficult to achieve sufficient performance enhancement.

Conversely, in the variable-focal-length lens system 1, a value above the upper limit of the conditional expression (5) causes off-axis light beams incident on the negative lens L21 of the second lens group G2 in the wide-angle end state to move away from the optical axis, that is, causes off-axis light beams incident on the first lens group G1 to greatly move away from the optical axis. Consequently, in the variable-focal-length lens system 1, comatic aberration that occurs in the first lens group G1 becomes extremely large, making it difficult to achieve sufficient performance enhancement.

Further, in the variable-focal-length lens system 1, in order to reduce the lens diameter in each lens group, and correct for variations in off-axis aberration accompanying changes in lens position state in a satisfactory manner, it is desirable to arrange an aperture stop S near the third lens group G3.

Generally speaking, in the case when the lens position state changes, the greater the number of lens groups whose distances to the aperture stop S change, the more likely the height of off-axis light beams passing through each lens group is to change. Variations in off-axis aberration accompanying changes in lens position state are corrected for by exploiting this height. At this time, actively changing the height of off-axis light beams allows the correction to be performed in a more satisfactory manner.

In particular, in the variable-focal-length lens system 1, if the aperture stop S is arranged near the third lens group G3, a plurality of movable lens groups can be arranged in a well-balanced manner in front and in rear of the aperture stop S. Comatic aberration can be thus corrected in a more satisfactory manner, thereby allowing performance enhancement.

In the variable-focal-length lens system 1, the third lens group G3 is located in the vicinity of the center of the lens system to thereby keep off-axis light beams passing through individual lens groups from becoming too far away in height. As a result, the lens diameter can be reduced.

It should be noted that in the variable-focal-length lens system 1, the aperture stop S is arranged on the object side of the third lens group G3, and as the lens position state changes, the aperture stop S and the third lens group G3 are moved integrally, thereby achieving a further reduction in lens diameter and simplification of the lens-barrel structure.

In the variable-focal-length lens system 1, by arranging the aperture stop S on the object side of the third lens group G3, in particular, the height of off-axis light beams passing through the first lens group G1 in the wide-angle end state can be brought closer to the optical axis to achieve miniaturization.

At the same time, in the variable-focal-length lens system 1, since the off-axis light beams passing through the first lens group G1 in the wide-angle end state are brought closer to the optical axis, comatic aberration that occurs around the edges of the picture plane can be suppressed, thereby achieving performance enhancement.

Incidentally, when focusing from a subject located at infinity to a subject located at a short distance (hereinafter, this will be referred to as "close-in focusing"), in the variable-focal-length lens system 1, it is desirable to move the fifth lens group G5 in the optical axis direction.

This is because since the fifth lens group G5 is arranged at a location close to the image plane position, and on-axis light beams and off-axis light beams pass through the fifth lens group G5 in a state where these light beams are far away from each other, correction can be performed independently for the on-axis light beams and the off-axis light beams, which is suitable for correcting for variations in off-axis aberration accompanying changes in subject's position.

Further, in the variable-focal-length lens system 1, to achieve reduction of the lens diameter and shortening of the total length of the lens system in a well-balanced manner, it is desirable that the following conditional expression (6) be satisfied:

$$1.8<f1/(fw \cdot ft)^{1/2}<2.7 \qquad (6)$$

where f1 is the focal length of the first lens group G1, fw is the focal length of the variable-focal-length lens system as a whole in the wide-angle end state, and ft is the focal length of the variable-focal-length lens system as a whole in the telephoto end state.

The conditional expression (6) defines the first lens group G1. In the variable-focal-length lens system 1, a value above the upper limit of the conditional expression (6) causes the converging action of the first lens group G1 to weaken, resulting in an increase in the total length of the lens system in the telephoto end state.

Conversely, in the variable-focal-length lens system 1, a value below the lower limit of the conditional expression (6) causes the converging action of the first lens group G1 to intensify. Consequently, off-axis light beams in the wide-angle end state move away from the optical axis, resulting in an increase in lens diameter.

Incidentally, as the refractive power of the first lens group G1 becomes stronger, it becomes more difficult to correct high-order spherical aberration occurring in the first lens group G1 independently in the telephoto end state in a satisfactory manner. In this case, while it is also possible to form the aperture stop S as a variable stop so as to change the full aperture as the lens position state changes, this causes problems such as an increase in noise when shooting a subject at low light levels.

For this reason, in the variable-focal-length lens system 1, in order to correct high-order spherical aberration occurring independently in the first lens group G1 in a more satisfactory manner, and make the full-aperture F value in the telephoto end state bright, it is desirable to set the lower limit of the conditional expression (6) to "2.0".

Further, in the variable-focal-length lens system 1, in order to correct spherical aberration occurring in the first lens group G1 independently and, in particular, to achieve satisfactory optical performance in the telephoto end state, it is desirable that the first lens group G1 include a cemented lens of a negative lens whose concave surface faces the image side and a positive lens whose convex surface faces the object side.

It is also possible to separate this cemented lens into a negative lens and a positive lens, in which case chromatic aberration or spherical aberration occurring in the first lens group G1 can be also corrected in a satisfactory manner.

However, if the cemented lens is separated into a negative lens and a positive lens in the variable-focal-length lens system 1, small eccentricities introduced during manufacture also cause a significant deterioration in optical performance. For this reason, a cemented lens is more desirable.

Further, in the variable-focal-length lens system 1, under the above-described configuration of the first lens group G1, the following conditional expression (7) is satisfied, thereby attaining sufficient optical performance even when the angle of view is widened in the wide-angle end state:

$$0.01 < fw/R13 < 0.12 \qquad (7)$$

where R13 is the curvature radius of the lens surface of the first lens group G1 located on the most image side.

The conditional expression (7) defines the shape of the first lens group G1. In the variable-focal-length lens system 1, a value above the upper limit of the conditional expression (7) makes it difficult to correct negative spherical aberration occurring due to the first lens group G1 in the telephoto end state in a satisfactory manner, which in turn makes it difficult to achieve sufficient performance enhancement.

Conversely, in the variable-focal-length lens system 1, a value below the lower limit of the conditional expression (7) causes off-axis light beams incident on the first lens group G1 to move away from the optical axis, resulting in a state in which off-axis light beams exiting the first lens group G1 are sharply refracted.

As a result, in the variable-focal-length lens system 1, it is not possible to suppress deterioration in optical performance due to eccentricity of the first lens group G1 and the second lens group G2 relative to each other introduced during manufacture, making it difficult to ensure stable optical quality.

In addition, in the variable-focal-length lens system 1, aspherical lenses are used to realize further enhanced optical performance. In particular, in the variable-focal-length lens system 1, by using aspherical lenses in the second lens group G2, variations in comatic aberration due to the angle of view occurring in the wide-angle end state can be corrected for in a satisfactory manner.

In the variable-focal-length lens system 1, further enhancement in center performance is possible by introducing aspherical lenses to the third to fifth lens groups G3 to G5. Further, it is needless to mention that in the variable-focal-length lens system 1, further enhanced optical performance can be attained by using a plurality of aspherical surfaces in a single optical system.

In addition, in the variable-focal-length lens system 1, the image can be shifted by shifting one of the lens groups constituting the lens system, or some of lenses constituting a single lens group, in a direction substantially perpendicular to the optical axis.

In the variable-focal-length lens system 1, the lens system is combined with a detection system for detecting the tilt of the camera, computation system for computing the amount of movement on the basis of shake information from the detection system, and a drive system for shifting predetermined lenses in accordance with the amount-of-movement information from the computation system.

Thus, in the variable-focal-length lens system 1, image blur caused by camera shake occurring at the time of shutter release can be canceled out or mitigated by the lens shift. In particular, in the variable-focal-length lens system 1, it is possible to reduce changes in performance occurring when the third lens group G3 is shifted in a direction substantially perpendicular to the optical axis.

Further, in the variable-focal-length lens system 1, if the aperture stop S is arranged near the third lens group G3, off-axis light beams pass in the vicinity of the optical axis, thereby making it possible to suppress variations in off-axis aberration occurring when the third lens group G3 is shifted in a direction substantially perpendicular to the optical axis.

It is needless to mention that in the variable-focal-length lens system 1, it is of course possible to arrange a low-pass filter on the image side of the lens system to prevent occurrence of so-called moire fringes, or to arrange an infrared-cut-off filter in accordance with the spectral-sensitivity characteristics of light-receiving devices.

3-2. Configuration of Digital Still Camera

As shown in FIG. 10, a digital still camera 100 equipped with the imaging apparatus described above has a camera block 15 having an imaging function, and a camera signal processing section 20 that performs signal processing such as analog/digital conversion on an image signal captured by the camera block 15.

Also, the digital still camera 100 has an image processing section 30 that performs processing such as recording and reproduction of an image signal, an LCD (Liquid Crystal Display) 40 that displays a shot image or the like, and a reader/writer 50 that writes/reads data to/from a memory card 51.

In addition, the digital still camera 100 has a CPU (Central Processing Unit) 60 that controls the entire camera, an input section 70 for the user to make operation inputs, and a lens-drive control section 80 that controls the drive of lenses in the camera block 15.

The camera block 15 is configured as a combination of an optical system including the variable-focal-length lens system 1 (or 11, 12, 13, 14), and an imaging device 16 formed by, for example, a CCD (Charge Coupled Device) sensor or a CMOS (Complementary Metal Oxide Semiconductor) sensor.

The camera signal processing section 20 performs signal processing on an output signal from the imaging device 16, such as conversion to a digital signal, noise removal, image quality correction, and conversion to a luminance/color difference signal.

The image processing section 30 performs compression/encoding and decompression/decoding of an image signal based on a predetermined image data format, conversion of data specification such as resolution, and the like.

The memory card 51 is configured by a removable semiconductor memory. The reader/writer 50 writes image data encoded by the image processing section 30 onto the memory card 51, or reads image data recorded on the memory card 51.

The CPU 60 controls each circuit block in the digital still camera 100 in a centralized manner, and controls each circuit block on the basis of an instruction input signal or the like from the input section 70.

The input section 70 includes, for example, a shutter release button for a shutter operation, a selecting switch for selecting an operation mode, and the like, and outputs an instruction input signal based on a user's operation to the CPU 60.

The lens-drive control section 80 controls a motor or the like (not shown) that drives lenses in the variable-focal-length lens system 1 (or 11, 12, 13, 14), on the basis of a control signal from the CPU 60.

Next, operation of the digital still camera 100 will be briefly described. In the digital still camera 100, when in the shooting standby state, under control by the CPU 60, an image signal captured by the camera block 15 is outputted to the LCD 40 via the camera signal processing section 20, and displayed as a camera-through image.

In the digital still camera 100, when an instruction input signal for zooming from the input unit 70 is inputted, the CPU 60 outputs a control signal to the lens-drive control section 80, and predetermined lenses in the variable-focal-length lens system 1 are moved on the basis of control by the lens-drive control section 80.

Then, in the digital still camera 100, when the shutter (not shown) of the camera block 15 is released in response to the instruction input signal from the input unit 70, a captured image signal is outputted from the camera signal processing section 20 to the image processing section 30.

In the image processing section 40, the image signal supplied from the camera signal processing section 20 is subjected to predetermined compression/encoding, and then converted into digital data in a predetermined data format, which is written onto the memory card 51 via the reader/writer 50.

It should be noted that focusing is performed by the lens-drive control section 80 controlling the drive of the variable-focal-length lens system 1 (or 11, 12, 13, 14) on the basis of the control signal from the CPU 60 when, for example, the shutter is half-pressed, or is full-pressed for recording.

To play back image data recorded on the memory card 51, the CPU 60 reads the image data from the memory card 51 in accordance with an operation on the input section 70, and after performing decompression/decoding by the image processing section 30, outputs the resulting image to the LCD 40.

In the LCD 40, a playback image is displayed on the basis of the image data that has been decompressed/decoded in the image processing section 30.

While the above description is directed to the case in which the imaging apparatus according to an embodiment of the present invention is applied to a digital still camera, it is also possible to apply the imaging apparatus according town embodiment of the present invention to, for example, other types of imaging apparatus such as a digital video camera.

4. Other Embodiments

The above-described embodiment, and the specific shapes and structures of individual sections as well as the numerical values indicated in the first to fourth numerical examples are merely illustrative examples of implementation in carrying out the present invention, and should not be construed as limiting the technical scope of the present invention.

The above description of the embodiment is directed to the case in which, in order to reduce the lens diameter in each lens group and correct for variations in off-axis aberration accompanying changes in lens position state in a satisfactory manner, the aperture stop S is arranged near the third lens group G3 and on the object side with respect to the third lens group G3.

However, the present invention is not limited to this. The aperture stop S may be arranged near the third lens group G3 and on the image side with respect to the third lens group G3.

Further, while the above-described embodiment is directed to the case in which the imaging apparatus is equipped in, for example, the digital still camera 100, the equipment in which the imaging apparatus is to be equipped is not limited to this, but the imaging apparatus may be applied to a wide range of other various types of electronic equipment such as a digital video camera, a mobile telephone, a camera-equipped personal computer, and a camera-embedded PDA.

The present application contains subject matter related to that disclosed in Japanese Priority Patent Application JP 2009-046783 filed in the Japan. Patent Office on Feb. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable-focal-length lens system comprising, in order from an object side:
    a first lens group having positive refractive power;
    a second lens group having negative refractive power;
    a third lens group having positive refractive power;
    a fourth lens group having negative refractive power; and
    a fifth lens group having positive refractive power,
    wherein as a lens position state changes from a wide-angle end state to a telephoto end state, an air space between the first lens group and the second lens group increases, an air space between the second lens group and the third lens group decreases, an air space between the third lens group and the fourth lens group changes, an air space between the fourth lens group and the fifth lens group increases, the first lens group moves monotonously to the object side, the second lens group is fixed in an optical axis direction, and the third lens group and the fourth lens group move to the object side, and
    the following conditional expressions (1) and (2) are satisfied $$0.2 < D23w/ft < 0.4 \quad (1)$$

$$0.1 < f2/f4 < 0.4 \quad (2)$$

where D23$w$ is an air space between the second lens group and the third lens group in the wide-angle end state, ft is a focal length of the variable-focal-length lens system as a whole in the telephoto end state, f2 is a focal length of the second lens group, and f4 is a focal length of the fourth lens group.

2. The variable-focal-length lens system according to claim 1, wherein at least one of the following conditional expressions (3) and (4) is satisfied $$0.3 < |f2|/(fw \cdot ft)^{1/2} < 0.55 \quad (3)$$

$$0.3 < \Delta 4/\Delta 3 < 0.9 \quad (4)$$

where f2 is a focal length of the variable-focal-length lens system as a whole in the second lens group, fw is a focal length of the variable-focal-length lens system as a whole in the wide-angle end state, Δ4 is an amount of movement of the fourth lens group from the wide-angle end state to the telephoto end state, and Δ3 is an amount of movement of the third lens group from the wide-angle end state to the telephoto end state.

3. The variable-focal-length lens system according to claim 1 or 2, wherein:
   the second lens group includes three lenses that are, in order from the object side, a negative lens L21 whose concave surface faces an image side, a negative lens L22 having a biconcave shape, and a positive lens L23 whose convex surface faces the object side; and
   the following conditional expression (5) is satisfied $$1<|f21|/fw<1.7$$

where f21 is a focal length of the negative lens L21.

4. The variable-focal-length lens system according to claim 1, wherein an aperture stop is arranged near the third lens group.

5. The variable-focal-length lens system according to claim 4, wherein the aperture stop is arranged on the object side of the third lens group, and moves integrally with the third lens group as the lens position state changes.

6. The variable-focal-length lens system according to claim 1, wherein the fifth lens group moves to compensate for variations in image plane position that occur as a subject's position changes.

7. The variable-focal-length lens system according to claim 1, wherein the following conditional expression (6) is satisfied $$1.8<f1/(fw\cdot ft)^{1/2}<2.7 \qquad (6)$$

where f1 is a focal length of the first lens group.

8. The variable-focal-length lens system according to claim 7, wherein the first lens group includes a cemented lens having, in order from the object side, a negative lens having a meniscus shape whose concave surface faces an image side, and a positive side whose convex surface faces the object side.

9. The variable-focal-length lens system according to claim 8, wherein the following conditional expression (7) is satisfied $$0.01<fw/R13<0.12 \qquad (7)$$

where R13 is a curvature radius of a lens surface of the first lens group located on the most image side.

10. An imaging apparatus comprising:
    a variable-focal-length lens system; and
    an imaging device that converts an optical image formed by the variable-focal-length lens system into an electrical signal,
    wherein the variable-focal-length lens system includes, in order from an object side,
    a first lens group having positive refractive power,
    a second lens group having negative refractive power,
    a third lens group having positive refractive power,
    a fourth lens group having negative refractive power, and
    a fifth lens group having positive refractive power,
    as a lens position state changes from a wide-angle end state to a telephoto end state, an air space between the first lens group and the second lens group increases, an air space between the second lens group and the third lens group decreases, an air space between the third lens group and the fourth lens group changes, an air space between the fourth lens group and the fifth lens group increases, the first lens group moves monotonously to the object side, the second lens group is fixed in an optical axis direction, and the third lens group and the fourth lens group move to the object side, and
    the following conditional expressions (1) and (2) are satisfied $$0.2<D23w/ft<0.4 \qquad (1)$$

$$0.1<f2/f4<0.4 \qquad (2)$$

where D23$w$ is an air space between the second lens group and the third lens group in the wide-angle end state, ft is a focal length of the variable-focal-length lens system as a whole in the telephoto end state, f2 is a focal length of the second lens group, and f4 is a focal length of the fourth lens group.

* * * * *